(12) United States Patent
Deguchi et al.

(10) Patent No.: US 10,185,636 B2
(45) Date of Patent: Jan. 22, 2019

(54) METHOD AND APPARATUS TO VIRTUALIZE REMOTE COPY PAIR IN THREE DATA CENTER CONFIGURATION

(71) Applicant: Hitachi, Ltd., Tokyo (JP)

(72) Inventors: Akira Deguchi, Tokyo (JP); Azusa Jin, Tokyo (JP); Toru Suzuki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 103 days.

(21) Appl. No.: 15/110,996

(22) PCT Filed: Aug. 15, 2014

(86) PCT No.: PCT/US2014/051268
§ 371 (c)(1),
(2) Date: Jul. 12, 2016

(87) PCT Pub. No.: WO2016/024994
PCT Pub. Date: Feb. 18, 2016

(65) Prior Publication Data
US 2016/0342490 A1    Nov. 24, 2016

(51) Int. Cl.
*G06F 11/00* (2006.01)
*G06F 11/16* (2006.01)
(Continued)

(52) U.S. Cl.
CPC ........ *G06F 11/1662* (2013.01); *G06F 3/0605* (2013.01); *G06F 3/065* (2013.01); *G06F 3/067* (2013.01); *G06F 3/0619* (2013.01); *G06F 3/0644* (2013.01); *G06F 3/0647* (2013.01); *G06F 3/0665* (2013.01); *G06F 3/0683* (2013.01); *G06F 11/2058* (2013.01); (Continued)

(58) Field of Classification Search
CPC ... G06F 11/1662; G06F 3/0644; G06F 3/0647
See application file for complete search history.

(56) References Cited

U.S. PATENT DOCUMENTS 7,373,470 B2   5/2008   Ninose et al.
7,418,439 B2 * 8/2008   Wong .................. G06F 11/2069
(Continued)

OTHER PUBLICATIONS

International Search Report of PCT/US2014/051268 dated Nov. 20, 2014.

*Primary Examiner* — Marc Duncan
*Assistant Examiner* — Jonathan D Gibson
(74) *Attorney, Agent, or Firm* — Mattingly & Malur, PC

(57) ABSTRACT

A first storage system manages a first volume, with a first internal volume identifier, and to provide the first volume with a given first virtual volume identifier to a server. A second storage system manages a second volume, with a second internal volume identifier, and to provide the second volume with the given first virtual volume identifier to the server. A third storage system manages a third volume. The first storage system manages a first copy pair between the first volume and the third volume with a first internal copy identifier, and to provide a first copy pair with a given virtual copy pair identifier to the server. The second storage system manages a second copy pair between the second volume and the third volume with a second internal copy identifier, and to provide a second copy pair with the given virtual copy pair identifier to the server.

20 Claims, 39 Drawing Sheets

(51) Int. Cl.
*G06F 11/20* (2006.01)
*G06F 3/06* (2006.01)

(52) U.S. Cl.
CPC ...... *G06F 11/2069* (2013.01); *G06F 11/2074* (2013.01); *G06F 11/2082* (2013.01); *G06F 2201/805* (2013.01); *G06F 2201/815* (2013.01); *G06F 2201/855* (2013.01)

(56) References Cited

U.S. PATENT DOCUMENTS

| | | | |
|---|---|---|---|
| 7,529,950 B2 | 5/2009 | Deguchi et al. | |
| 8,060,777 B2* | 11/2011 | Ninose | G06F 11/2069 709/239 |
| 8,412,672 B1* | 4/2013 | Radhakrishnan | H04L 67/1097 707/609 |
| 8,578,204 B1 | 11/2013 | Ortenberg et al. | |
| 9,619,171 B2* | 4/2017 | Nakagawa | G06F 3/065 |
| 2006/0069865 A1* | 3/2006 | Kawamura | G06F 11/2064 711/114 |
| 2007/0233981 A1* | 10/2007 | Arakawa | G06F 11/2064 711/162 |
| 2008/0034005 A1* | 2/2008 | Satoyama | G06F 3/0617 |
| 2008/0104346 A1* | 5/2008 | Watanabe | G06F 11/2069 711/162 |
| 2008/0104347 A1* | 5/2008 | Iwamura | G06F 11/2076 711/162 |
| 2008/0104443 A1* | 5/2008 | Akutsu | G06F 11/2058 714/6.12 |
| 2008/0307120 A1* | 12/2008 | Ogawa | G06F 11/1451 710/19 |
| 2009/0013012 A1* | 1/2009 | Ichikawa | G06F 11/1464 |
| 2009/0094403 A1* | 4/2009 | Nakagawa | G06F 3/0605 711/6 |
| 2011/0066801 A1* | 3/2011 | Sato | G06F 3/0605 711/114 |
| 2011/0251999 A1* | 10/2011 | Takahashi | G06F 11/2058 707/636 |
| 2011/0307596 A1* | 12/2011 | Kaneko | G06F 3/0605 709/223 |
| 2012/0030440 A1* | 2/2012 | Miwa | G06F 3/0617 711/162 |
| 2012/0079224 A1* | 3/2012 | Clayton | G06F 11/1456 711/162 |
| 2012/0246511 A1* | 9/2012 | Sato | G06F 11/2007 714/6.2 |
| 2014/0068210 A1 | 3/2014 | Deguchi | |
| 2014/0149666 A1* | 5/2014 | Nakagawa | G06F 3/0605 711/114 |
| 2014/0201438 A1* | 7/2014 | Saito | G06F 3/0619 711/114 |

* cited by examiner

Storage 200a

| Volume ID | Internal ID | WWPN | Path Status |
|---|---|---|---|
| 0 | 0 | WWPN A | Active |
| 1 | 1 | WWPN C | Active |
| 2 | 2 | WWPN E | Active |
| ... | ... | ... | |

Storage 200b

| Volume ID | Internal ID | WWPN | Path status |
|---|---|---|---|
| 0 | 10 | WWPN B | Active |
| 1 | 11 | WWPN D | Active |
| 2 | 12 | WWPN F | Active |
| | | WWPN G | Passive |
| ... | ... | ... | |

FIG. 7

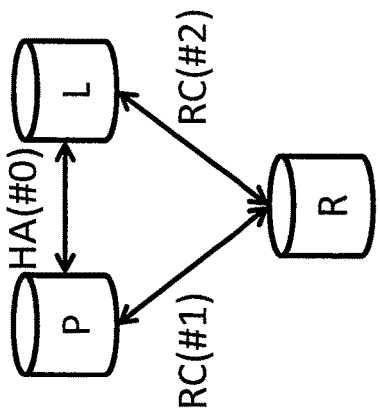

HA pair table (example for storage(P))

| PVOL ID (Internal ID) | Pair Storage | Copy Attribute | Pair VOL ID (Internal ID) | Mirror ID | Status | Valid Flag |
|---|---|---|---|---|---|---|
| 0 | Storage(L) | Source | 10 | 0 | Mirror | - |
| 1 | Storage(L) | Source | 11 | 0 | Mirror | - |
| 2 | Storage(L) | Source | 12 | 0 | Suspend | Valid |
| ... | ... | ... | ... | ... | ... | |

HA pair table (example for storage(L))

| LVOL ID (Internal ID) | Pair Storage | Copy Attribute | Pair VOL ID (Internal ID) | Mirror ID | Status | Valid Flag |
|---|---|---|---|---|---|---|
| 10 | Storage(P) | Target | 0 | 0 | Mirror | - |
| 11 | Storage(P) | Target | 1 | 0 | Mirror | - |
| 12 | Storage(P) | Target | 2 | 0 | Mirror | Invalid |
| ... | ... | ... | ... | ... | ... | |

FIG. 8

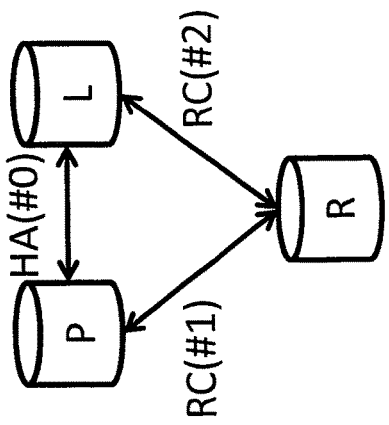

Remote Copy pair table (example for storage(P))

| PVOL ID (Internal ID) | Pair Storage | Copy Attribute | Pair VOL ID (Internal ID) | Mirror ID | Virtual Mirror ID | Pair Status |
|---|---|---|---|---|---|---|
| 0 | Storage(R) | Source | 20 | 1 | 1 | PAIR |
| 1 | Storage(R) | Source | 21 | 1 | 1 | PAIR |
| 2 | Storage(R) | Source | 22 | 1 | 1 | PAIR |
| ... | ... | ... | ... | ... | ... | ... |

Remote Copy pair table (example for storage(L))

| LVOL ID (Internal ID) | Pair Storage | Copy Attribute | Pair VOL ID (Internal ID) | Mirror ID | Virtual Mirror ID | Pair Status |
|---|---|---|---|---|---|---|
| 10 | Storage(R) | Source | 20 | 2 | 1 | Standby |
| 11 | Storage(R) | Source | 21 | 2 | 1 | Standby |
| 12 | Storage(R) | Source | 22 | 2 | 1 | Standby |
| ... | ... | ... | ... | ... | ... | ... |

FIG. 9

Remote Copy pair table (example for storage(R))

| RVOL ID (Internal ID) | Target Storage | Copy Attribute | Pair VOL ID (Internal ID) | Mirror ID | Virtual Mirror ID | Pair Status |
|---|---|---|---|---|---|---|
| 20 | Storage(P) | Target | 20 | 1 | 1 | PAIR |
| 21 | Storage(P) | Target | 21 | 1 | 1 | PAIR |
| 22 | Storage(P) | Target | 22 | 1 | 1 | PAIR |
| 20 | Storage(L) | Target | 10 | 2 | 1 | Standby |
| 21 | Storage(L) | Target | 11 | 2 | 1 | Standby |
| 22 | Storage(L) | Target | 12 | 2 | 1 | Standby |
| ... | ... | ... | ... | ... | ... | ... |

| Remote copy group ID | Sequence Number | Volume ID (Internal ID) | Pair Storage | Pair Group ID |
|---|---|---|---|---|
| 1 | 1 | 0 | Storage(R) | 8 |
|   |   | 1 |   |   |
|   |   | 2 |   |   |
|   |   | ... |   |   |
| 2 | 1 | 3 | Storage(R) | 12 |
|   |   | 4 |   |   |
|   |   | 5 |   |   |
|   |   | ... |   |   |
| ... | ... | ... | ... | ... |

FIG. 11

| HA group ID | Volume ID (Internal ID) | Pair Storage | Pair Group ID | IO Pending Flag |
|---|---|---|---|---|
| 1 | 0 | Storage(L) | 6 | ON |
|   | 1 |  |  |  |
|   | 2 |  |  |  |
|   | ... |  |  |  |
| 2 | 3 | Storage(L) | 9 | OFF |
|   | 4 |  |  |  |
|   | 5 |  |  |  |
|   | ... |  |  |  |
| ... |  | ... | ... | ... |

FIG. 12

| Virtual Mirror ID | P-R Mirror ID | L-R Mirror ID |
|---|---|---|
| 1 | 1 | 8 |
| 2 | 2 | 10 |
| ... | ... | ... |

FIG. 35

METHOD AND APPARATUS TO VIRTUALIZE REMOTE COPY PAIR IN THREE DATA CENTER CONFIGURATION

BACKGROUND OF THE INVENTION

The present invention relates to active-active high availability (HA) storage systems and remote copy systems and, more particularly, to method and apparatus to virtualize remote copy pair in three data center configuration.

U.S. Pat. No. 7,529,950 discloses remote copy processing and, more specifically, journal technology to assure data consistency in a remote copy system. US 2011/0066801 discloses a cluster storage system having quorum disk. The system is an active-active HA storage system. When the communication path failure between the storage systems occurs, it determines which storage system continues processing by using lock disk (i.e., quorum disk). U.S. Pat. No. 8,578,204 discloses a cluster storage system having witness software, which is used instead of the quorum disk. In the case of the quorum disk, the storage systems execute arbitration processing. In the case of the witness software, the witness software accesses the storage systems and determines which storage system continues processing. The basic theory or concept, however, is same. U.S. Pat. No. 7,373,470 discloses a three data center remote copy system as a multi-target remote copy system. The first volume in first storage system is copied to the second volume in second storage system synchronously. The first volume is copied to the third volume in third storage system asynchronously. Each volume has a different volume ID. The server storing the data in the storage recognizes the three storage systems.

For remote copy of the data stored in an active-active HA storage system, the physical system configuration will be the same as the multi-target remote copy system. The first volume and second volume have the same ID in the active-active HA storage system and the server recognizes them as one volume. It is called virtual volume. The server should recognize one remote copy pair from the virtual volume to copy destination volume in third storage system. However, there are two remote copy pairs physically. Hence, with different remote copy pair IDs, two remote copy pair statuses will be reported to the server. For the server, clustering software such as a SRM (Site Recovery Manager) or traditional script cannot control and operate the remote copy system correctly.

The traditional multi-target remote copy system does not provide active-active features. The server can have access to only a first volume. When the first volume or first storage system failure occurs, the server, clustering software or script recognizes it and executes fail-over processing to the second storage system. The server can change the remote copy status between the second storage system and the third storage system from standby to active. However, in an active-active configuration, IO (Input/Output) from the server is not rejected after the first storage system failure. The IO is processed in the second storage system. Thus, there is no chance to change the remote copy pair status because the server cannot recognize the failure. This causes suspension of the remote copy data protection.

BRIEF SUMMARY OF THE INVENTION

Exemplary embodiments of the invention provide ways to virtualize remote copy pair in a three data center configuration and, more specifically, for remote copy of the data stored in an active-active HA storage system. Specific embodiments further automate activation of the standby remote copy pair when failure occurs for the regular remote copy pair. By using this invention, clustering software such as a SRM (Site Recovery Manager) or traditional script can be adapted to the remote copy of active-active HA storage system.

In accordance with an aspect of the present invention, a computer system comprises: a first storage system including a first storage device and a first controller being configured to manage a first volume, whose storage area corresponds to a storage area of the first storage device, with a first internal volume identifier, and to provide the first volume with a given first virtual volume identifier to a server; and a second storage system including a second storage device and a second controller being configured to manage a second volume, whose storage area corresponds to a storage area of the second storage device, with a second internal volume identifier, and to provide the second volume with the given first virtual volume identifier to the server. The first storage system and the second storage system are coupled to a third storage system including a third storage device and a third controller being configured to manage a third volume whose storage area corresponds to a storage area of the third storage device. The first controller in the first storage system is configured to manage a first copy pair between the first volume and the third volume with a first internal copy identifier, and to provide a first copy pair with a given virtual copy pair identifier to the server. The second controller in the second storage system is configured to manage a second copy pair between the second volume and the third volume with a second internal copy identifier, and to provide a second copy pair with the given virtual copy pair identifier to the server.

In some embodiments, one of the first copy pair and the second copy pair is a regular pair having an operation status, and the other of the first copy pair and the second copy pair is a standby pair having a standby status. In response to a write command to one of the first volume and the second volume, data of the write command that is copied from the one of the first volume and the second volume receiving the write command to the other one of the first volume and the second volume. Data of the write command is copied to the third volume by the regular pair.

In specific embodiments, one of the first copy pair and the second copy pair is a regular pair having an operation status, and the other of the first copy pair and the second copy pair is a standby pair having a standby status. The third controller is configured to create the standby pair using the given virtual copy pair identifier, the given virtual copy pair identifier being provided by the first internal copy identifier or the second internal copy identifier of the regular pair or the given virtual copy pair identifier of the regular pair.

In some embodiments, one of the first copy pair and the second copy pair is a regular pair having an operation status, and the other of the first copy pair and the second copy pair is a standby pair having a standby status. When copy operation of the regular pair is disenable, the standby pair is resynchronized to resynchronize data of the standby pair. After the standby pair is resynchronized, the standby pair is changed from the standby status to the operation status to take over the operation status of the regular pair.

In specific embodiments, the first volume and the second volume form a high availability pair. The first copy pair is the regular pair and the second copy pair is the standby pair. Upon receipt of a notification of failure of resource relating to the first copy pair from the first storage system, the second controller of the second storage system is configured to suspend the high availability pair between the first volume and the second volume, and then resynchronize the standby pair.

In some embodiments, the first volume and the second volume form a high availability pair. The first copy pair is the regular pair and the second copy pair is the standby pair. If the high availability pair of the first volume and the second volume is suspended and the second controller of the second storage system changes a high availability pair status of the second volume to suspend status and makes the second volume being able to execute a request from a server, the second controller of the second storage system is configured to resynchronize the standby pair.

In specific embodiments, the first volume and the second volume form a high availability pair. The first copy pair is the regular pair and the second copy pair is the standby pair. Upon receipt of a notification of failure of resource relating to the first copy pair from the first storage system, the second controller of the second storage system is configured to suspend the high availability pair of the first volume and the second volume, and obtains a sequence number which is stored in the first storage system to ensure data consistency for copying data to the third storage system, and resynchronize the standby copy pair.

In some embodiments, the first volume and the second volume form a high availability pair. The first copy pair is the regular pair and the second copy pair is the standby pair. Upon receipt of a notification of failure of resource relating to the first copy pair from the first storage system, the second controller of the second storage system obtains a sequence number which is stored in the first storage system to ensure data consistency for copying data to the third storage system, and resynchronize the standby copy pair.

In specific embodiments, in creating the first copy pair between the first volume and the third volume, when the first volume and the second volume have formed a high availability pair, the first copy pair is created as a regular pair having an operation status and the second copy pair is created as a standby pair having a standby status.

In some embodiments, in creating the first volume and the second volume as a high availability pair, when the first volume and the third volume have formed the first copy pair, the first copy pair is a regular pair having an operation status and the second copy pair is created as a standby pair having a standby status.

In specific embodiments, upon receiving a pair operation command by the first storage system, the first controller is configured to: execute the pair operation command for the first copy pair if the first copy pair is a regular pair having an operation status; and transfer the pair operation command to the second storage system to be executed by the second controller for the second copy pair if the first copy pair is a standby pair having a standby status.

In some embodiments, if the first copy pair is the regular pair having the operation status, and if a copy pair status of the first copy pair is SUSPEND(E) indicating suspension of copying between the first volume and the third volume in the first copy pair, and if the second copy pair which is a standby pair having a standby status can take over the copying to the third volume, the a result of the pair operation command is changed as the copy pair status of the first copy pair from SUSPEND(E) to PAIR indicating takeover of the copying by the second copy pair. If the first copy pair is the standby pair having the standby status, and if a copy pair status of the second copy pair is SUSPEND(E) indicating suspension of copying between the second volume and the third volume in the second copy pair, and if the first copy pair can take over the copying to the third volume, a result of the pair operation command is changed as the copy pair status of the second copy pair from SUSPEND(E) to PAIR indicating takeover of the copying by the first copy pair.

In specific embodiments, the first controller is configured, in response to a write request from the server to the first storage system, to: determine whether the first volume of the high availability pair has a VALID status indicating the first volume of the high availability pair has newest data as compared to the second volume, or an INVALID status; if the first volume has an INVALID status, send an error message to the server; and if the first volume has a VALID status, execute the write request to the first volume which is the target of the write request, record a write address of executing the write request in a differential bitmap of the high availability pair, and if a copy pair status of the first copy pair between the first volume and the third volume is SUSPEND, then record in the first storage system the write address in the differential bitmap of remote copy of data of the write request to the third storage system, and if the copy pair status of the first copy pair is PAIR or COPY, then obtain the sequence number which is stored in the first storage system and increment the sequence number, and create a journal and store the journal in a first journal volume of the first storage system.

Another aspect of the invention is directed to a method of managing a computer system which includes a first storage system having a first storage device and a first controller for managing a first volume, a second storage system having a second storage device and a second controller for managing a second volume, and a third storage system having a third storage device and a third controller. The method comprises: managing the first volume, whose storage area corresponds to a storage area of the first storage device, with a first internal volume identifier, and providing the first volume with a given first virtual volume identifier to a server; managing the second volume, whose storage area corresponds to a storage area of the second storage device, with a second internal volume identifier, and to provide the second volume with the given first virtual volume identifier to the server; managing the third volume whose storage area corresponds to a storage area of the third storage device; managing a first copy pair between the first volume and the third volume with a first internal copy identifier, and providing a first copy pair with a given virtual copy pair identifier to the server; and managing a second copy pair between the second volume and the third volume with a second internal copy identifier, and providing a second copy pair with the given virtual copy pair identifier to the server.

These and other features and advantages of the present invention will become apparent to those of ordinary skill in the art in view of the following detailed description of the specific embodiments.

BRIEF DESCRIPTION OF THE DRAWINGS

FIG. 7 shows examples of the volume table.

FIG. 8 shows examples of the HA pair table.

FIG. 9 shows examples of the remote copy pair table.

FIG. 11 is an example of the remote copy group table.

FIG. 12 shows an example of the HA group table.

FIG. 35 shows an example of a management server mirror ID table.

DETAILED DESCRIPTION OF THE INVENTION

Figure 1:
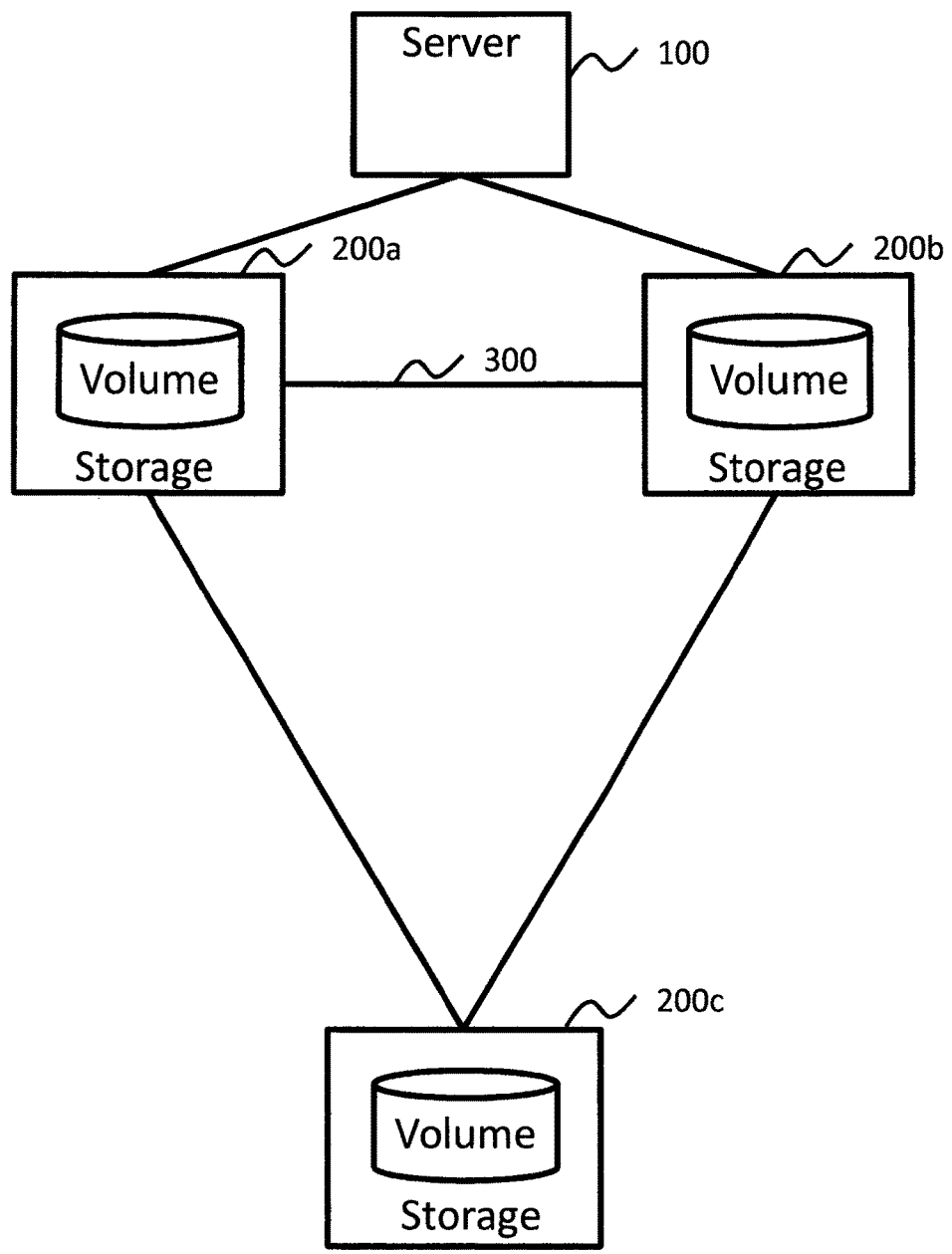
FIG. 1 illustrates an example of a hardware configuration of a computer system in which the method and apparatus of the invention may be applied.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium including non-transitory medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for virtualizing remote copy pair in three data center configuration.

In the following, the processing will be described while a "program" is handled as a subject in some cases. In the case in which the program is executed by a processor, the predetermined processing is executed. Consequently, a subject of a processing can also be a processor. The processing that is disclosed while a program is handled as a subject can also be a processing that is executed by a processor that executes the program or an apparatus that is provided with the processor (for instance, a control device, a controller, and a storage system). Moreover, a part or a whole of a processing that is executed when the processor executes a program can also be executed by a hardware circuit as substitute for or in addition to a processor.

FIG. 1 illustrates an example of a hardware configuration of a computer system in which the method and apparatus of the invention may be applied. The computer system includes a server and storage systems 200a, 200b and 200c. The storage systems are connected with each other via a network. In the example, the storages 200a and 200b constitute the active-active HA storage system. The volumes in the storages 200a and 200b have the same data and provide the data to the server. As such, the server recognizes them as one volume. The server can issue commands to both of the volumes. The data consistency is assured because written data is replicated between the storages 200a and 200b. The third storage 200c is a destination storage of remote copy for disaster recovery. There are two remote copy pairs physically. One of them is active and another is standby. The active remote copy pair copies the data to the storage 200c. Thus, the amount of the data transferred is not duplicated. In this disclosure, the first storage 200a is called storage(P: primary), the second storage 200b is called storage(L: local), and the third storage 200c is called storage(R: remote).

Figure 2:
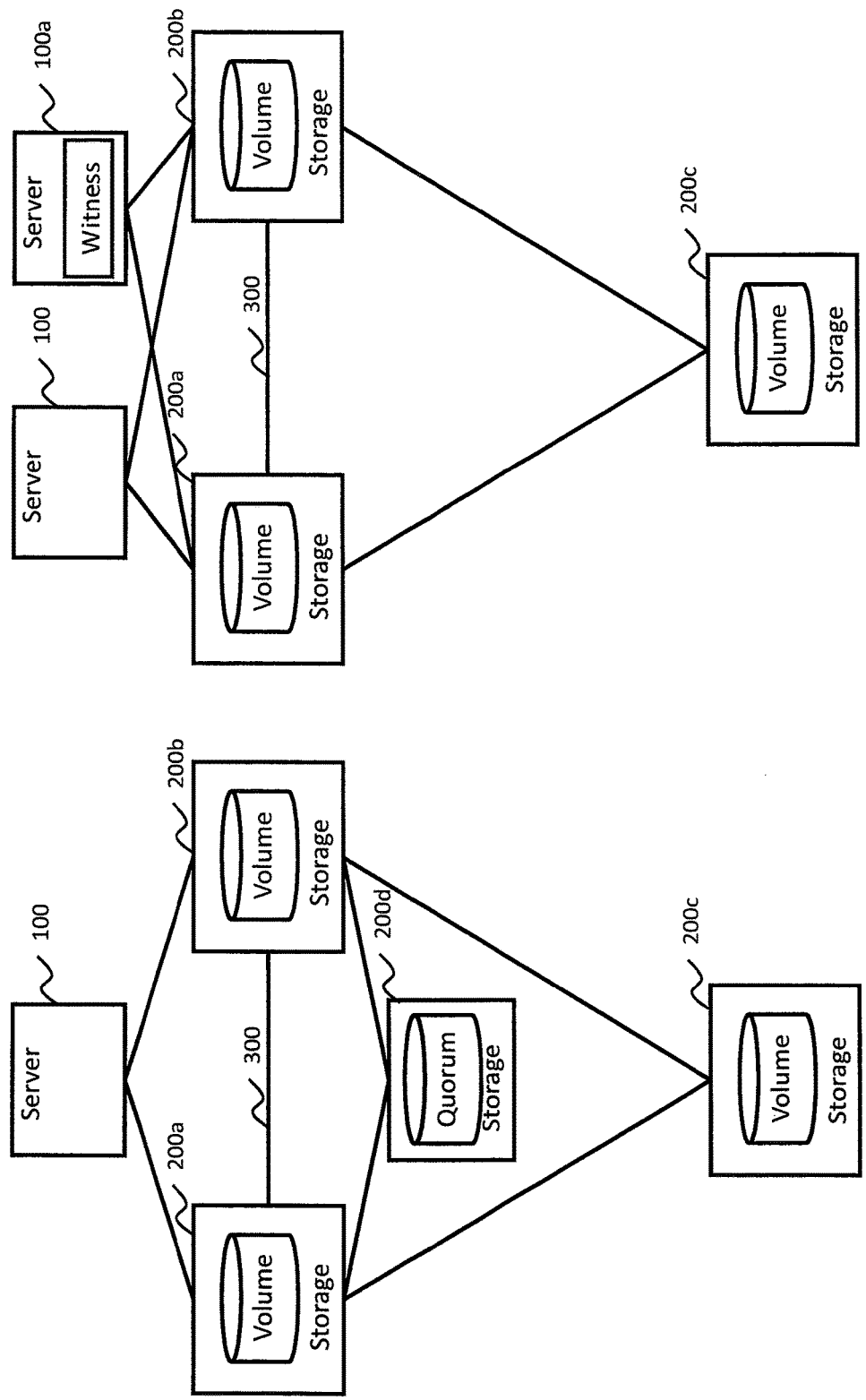
FIG. 2 illustrates additional examples of a hardware configuration of a computer system in which the method and apparatus of the invention may be applied.

FIG. 2 illustrates additional examples of a hardware configuration of a computer system in which the method and apparatus of the invention may be applied. In the computer system on the left side, a quorum storage system 200d has a quorum volume. The computer system on the right side has witness software in a second server 100a coupled to the first and second storages 200a, 200b. In the active-active HA storage system, if the communication path 300 failure occurs, both of the storages 200a and 200b cannot determine whether an IO request from the server should be processed or not. It means path failure causes shutdown of the computer system. The quorum disk or witness technology is used to avoid the situation. After the path failure, the storages 200a and 200b access the quorum disk and determine which storage continues the IO processing, or the witness technology is used to make the determination. In the left configuration, the path between the storages and quorum disk should be separated from the path between storages 200a and 200b physically. In the right configuration, the second server 100a is coupled with the storages 200a, 200b via paths that independent from the paths for the first server 100.

Figure 3:
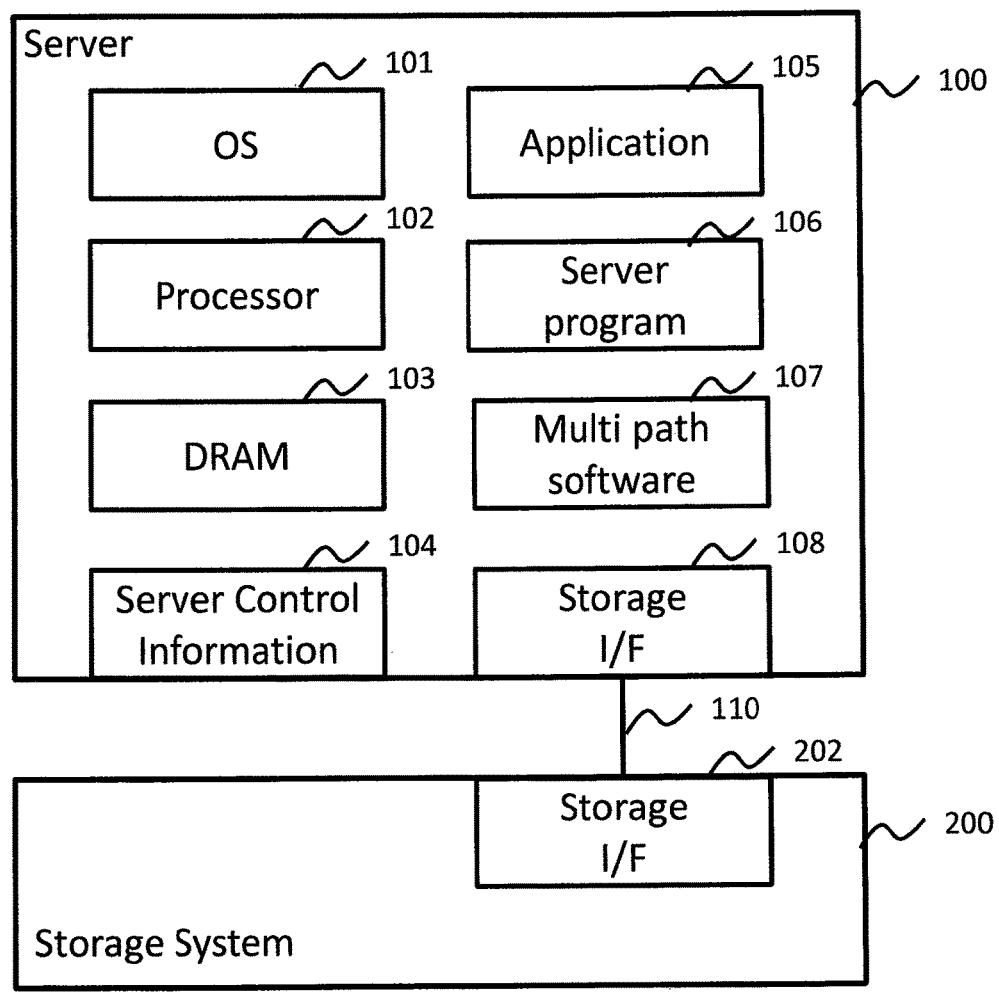
FIG. 3 shows an example of the server.

FIG. 3 shows an example of the server. The server 100 has OS (Operating System) 101, processor 102, DRAM 103, server control information 104, application 105, server program 106, multi path software 107, and storage I/F (interface) 108. The server 100 provides service by executing an OS and applications such as a database system. The data processed by the database system is stored in the storage system 200. The server 100 is coupled to the storage system 200 via a network 110.

Figure 4:
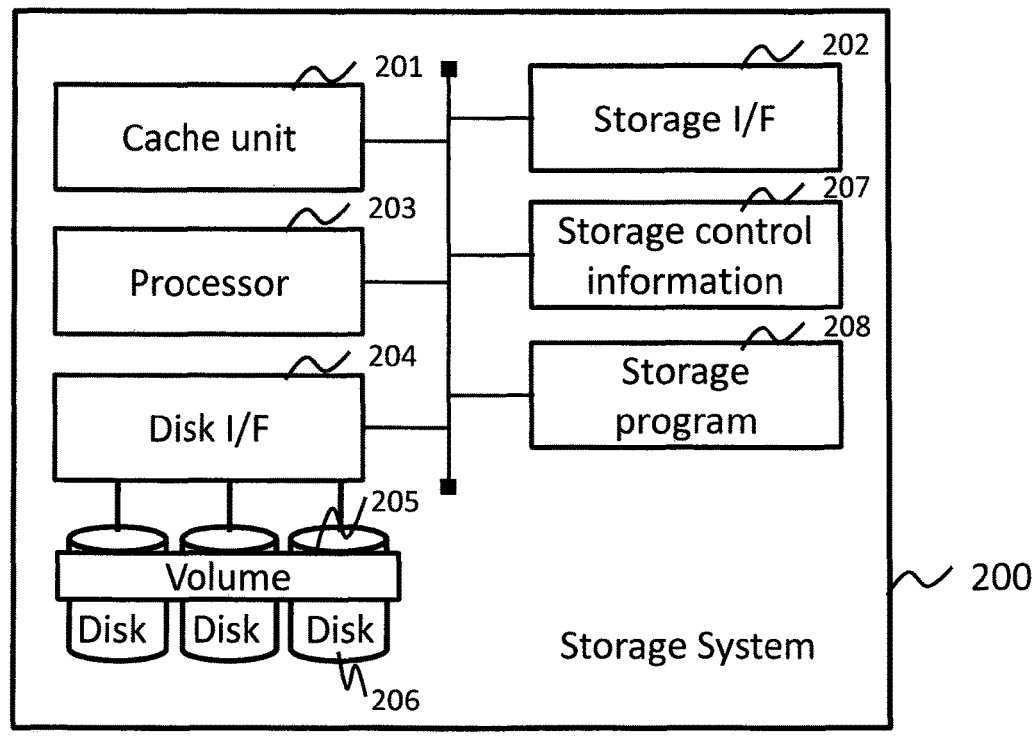
FIG. 4 shows an example of the storage.

FIG. 4 shows an example of the storage 200 (200a, 200b or 200c). The storage system includes cache unit 201, storage I/F, processor 203, disk I/F 204, volume 205, disks 206, storage control information 207, and storage program 208. The storage I/F 202 is coupled to the server 100 or another storage via a network 110 or 300, and mediates communication with the server 100 or another storage. The processor 203 executes a wide variety of processing by executing a wide variety of programs that have been stored into storage program 208. Moreover, the processor 203 executes a wide variety of processing by using a wide variety of information that has been stored into storage control information 207. The disk I/F 204 is coupled to at least one HDD (Hard Disk Drive) 206 as an example of a physical storage device via a bus. A volume 205 that is configured to manage data is configured by at least one storage region of the HDD 206 for instance. The physical storage device is not restricted to an HDD 206 and can also be an SSD (Solid State Drive) or a DVD for instance. Moreover, at least one HDD 206 can be collected up in a unit of a parity group, and a high reliability technique such as a RAID (Redundant Arrays of Independent Disks) can also be used. The storage control information 207 stores a wide variety of information used by a wide variety of programs. The storage program 208 stores a wide variety of programs, such as read processing program or write processing program and so on. The cache unit 201 caches the data stored in the HDD 206 for performance boost.

Figure 5:
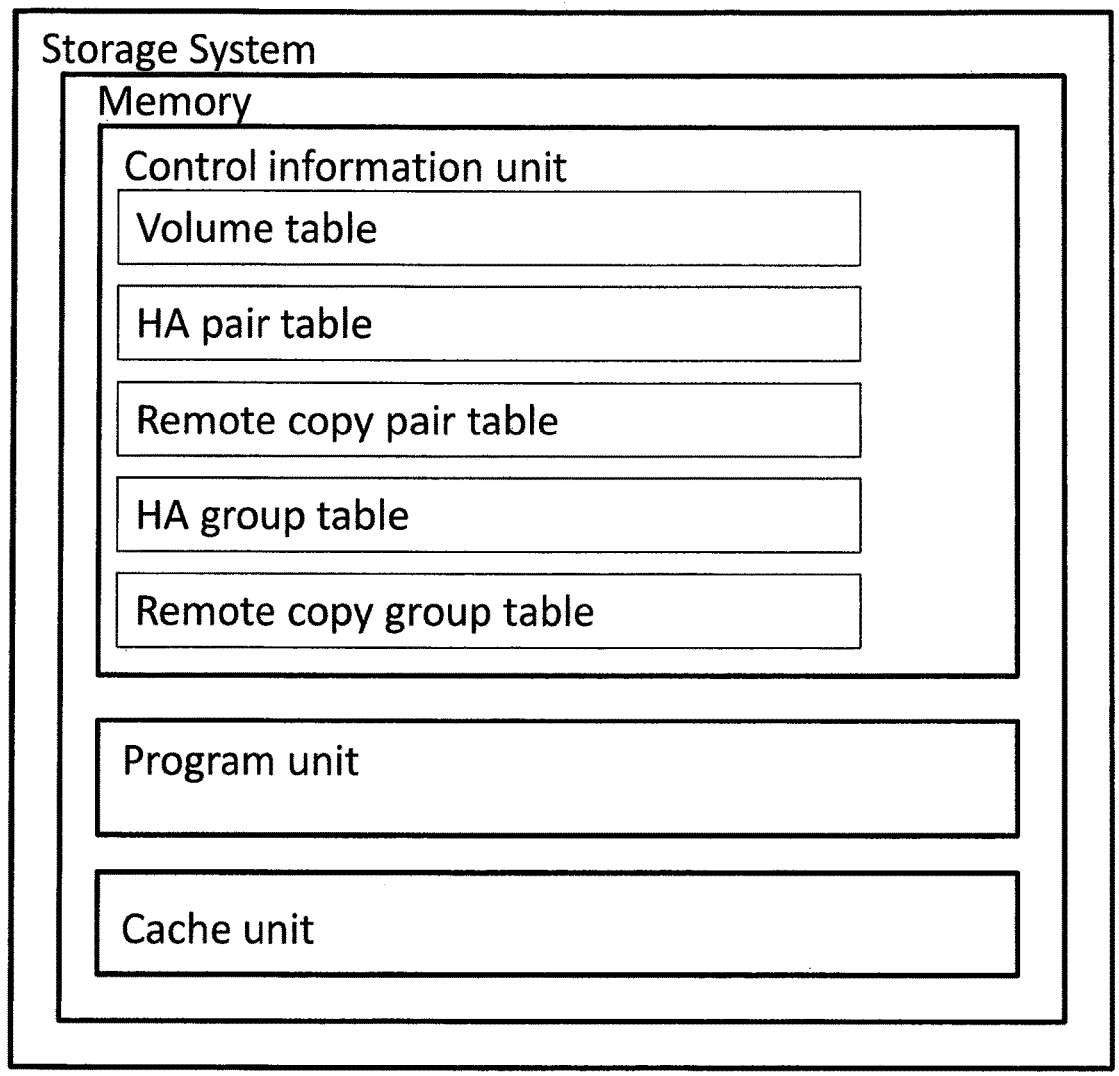
FIG. 5 shows an example of a control information unit in the memory of the storage system.

FIG. 5 shows an example of a control information unit in the memory of the storage system (200a, 200b, 200c). The memory has control information unit, program unit, and cache unit. The control information unit includes volume table (FIG. 7), HA pair table (FIG. 8), remote copy pair table (FIGS. 9 and 10), HA group table (FIG. 12), remote copy group table (FIG. 11). Details of the tables and programs are described below.

Figure 6:
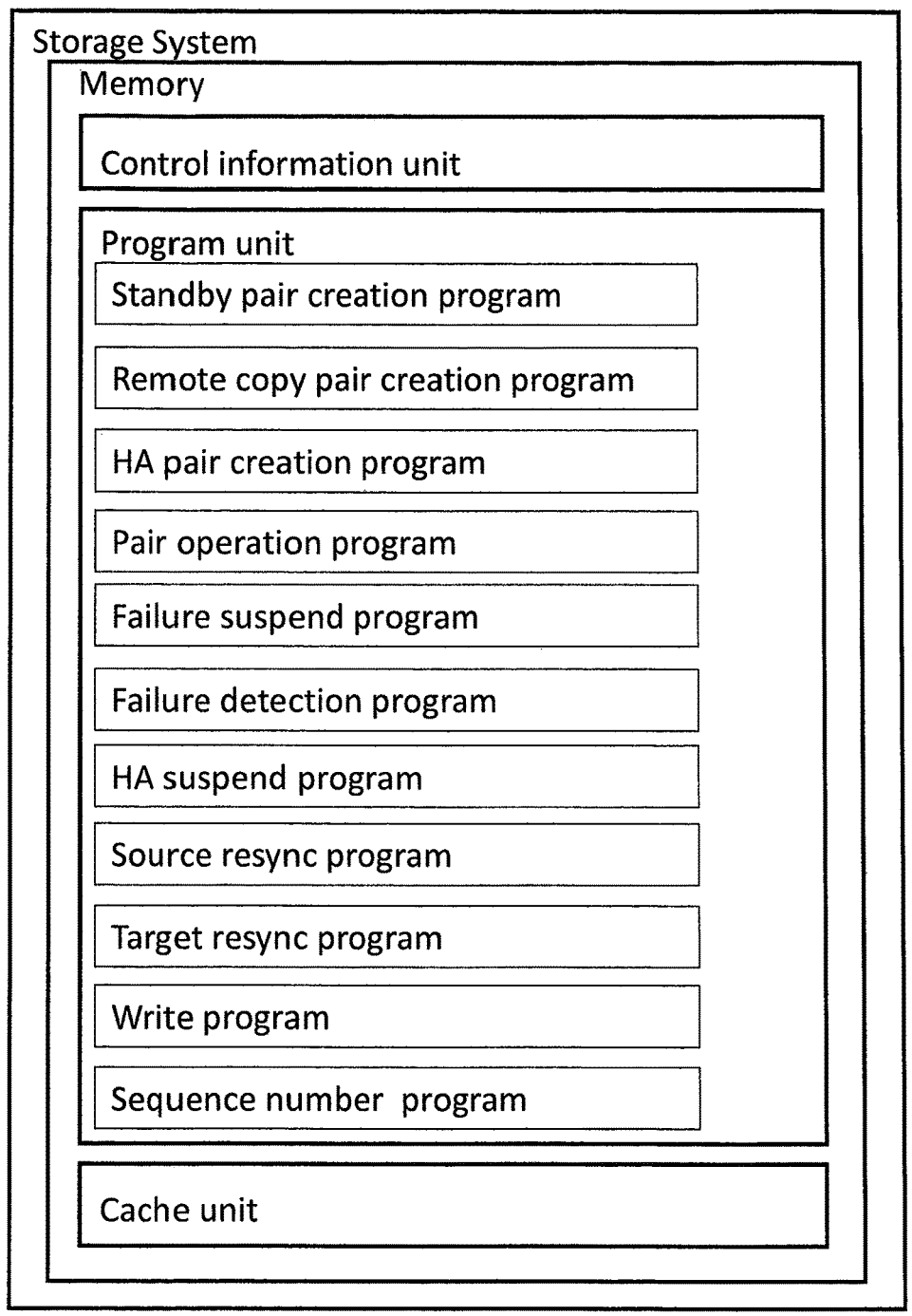
FIG. 6 shows an example of a program unit in the memory of the storage system.
Figure 29:
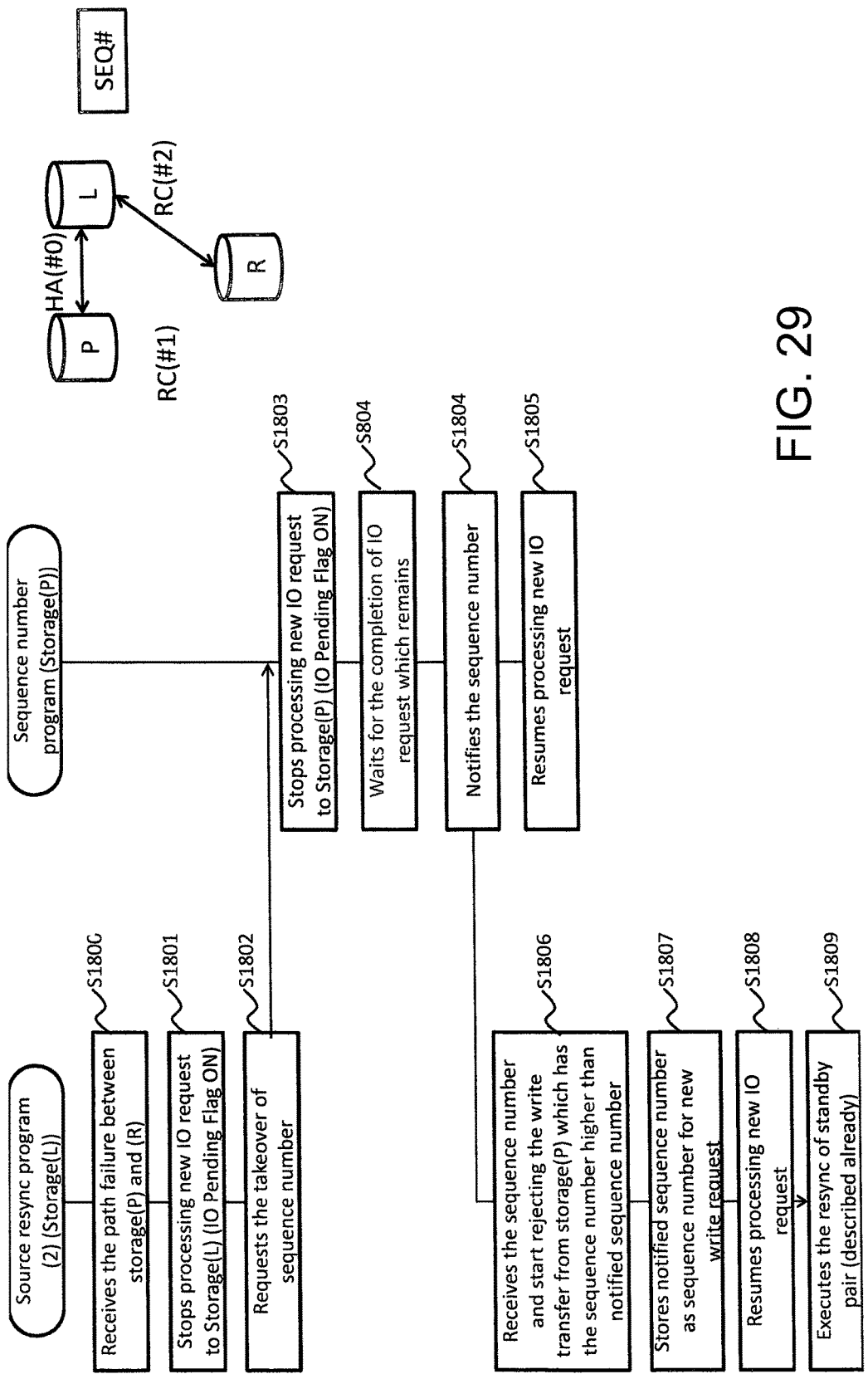
FIG. 29 shows a flow diagram illustrating another example of the process of the source resync program.

FIG. 6 shows an example of a program unit in the memory of the storage system. The program unit includes standby pair creation program (FIG. 13), remote copy pair creation program (FIG. 14), HA pair creation program (FIG. 15), pair operation program (FIGS. 16 and 17), failure suspend program (FIG. 18), failure detection program (FIGS. 21 and 25), HA suspend program (FIG. 22), source resync program (FIGS. 19 and 29), target resync program (FIG. 20), write program (FIGS. 23 and 26), and sequence number program (FIG. 29). Details of these programs are described below.

FIG. 7 shows examples of the volume table. The volume table has columns of Volume ID, internal ID, WWPN, and path status as attributes. The volume ID is an identification to identify the volume in the system. The internal ID is an identification to identify the volume in the storage system. The internal volume ID for the PVOL may be referred to as a first internal volume identifier of a first volume in a first storage system, and the internal volume ID for the LVOL may be referred to as a second internal volume identifier of a second volume in a second storage system. The storage WWPN (World Wide Port Name) is a port name to identify the port uniquely. The path status manages status of the path. Active means online and passive means offline. In this example, the data of volume 1 is stored in storage 200a and storage 200b for storage cluster. Write data to the volume 1 is replicated between these storage systems. The server has two paths. One of them is connected to the storage 200a and has WWPN A. Another path is connected to the storage 200b and has WWPN B.

FIG. 8 shows examples of the HA pair table. It includes an example for the primary storage(P) and an example the local storage(L). The HA pair table has columns of VOL ID (internal ID), pair storage, copy attribute, pair VOL ID (internal ID), mirror ID, pair status, and valid flag. HA storage constitutes HA pair which manages the relationship between source and destination of HA replication. VOL ID is an internal volume ID to identify the volume in the storage. The HA pair table in the storage(P) manages the internal volume ID in the storage(P). The internal volume in the storage(P) is called PVOL (primary volume). The HA pair table in the storage(L) manages the internal volume ID in the storage(L). The internal volume in the storage(L) is called LVOL (local volume). Pair storage manages the storage having pair volume of HA pair. Copy attribute manages whether the volume specified by the VOL ID is source or destination. Pair VOL ID is an internal volume ID to identify the volume in the pair storage. Mirror ID is an identification to identify the pair. Since one volume may have two or more pairs, the mirror ID is used in order to distinguish a pair.

Pair status manages pair status of the HA pair. Basically, mirror, copy, suspend(v), and suspend(i) are possible entries of the status. Copy means that data is copied initially between volumes. Mirror means that the initial copy is finished and write request from the server is replicated between volumes. Suspend(v) means that replication is suspended and the volume can execute the write request from the server. "v" means valid. Suspend(i) means that replication is suspended and the volume cannot execute the write request from the server. "i" means invalid. When the replication processing cannot be executed for the reason of path failure or the like, the pair is suspended. In that case, one of the volumes will be suspend(v) and the other will be suspend(i).

FIG. 9 shows examples of the remote copy pair table. It includes an example for storage(P) and an example for of storage(L). The remote copy pair table has columns of internal VOL ID, pair storage, copy attribute, pair VOL ID (internal ID), mirror ID, virtual mirror ID, and pair status. The meanings of VOL ID, pair storage, copy attribute and mirror ID are the same as those in the HA pair table of FIG. 8. Pair status manages pair status of remote copy pair. Basically, PAIR, COPY, SUSPEND, SUSPEND(E) are possible entries of the status. COPY means that data is copied initially between volumes. PAIR means that the initial copy is finished and write request from the server is replicated between volumes. SUSPEND means that replication is suspended by operation and the volume can execute the write request from the server. SUSPEND(E) means suspend status caused by error. The control information to manage the temporally area for storing transfer data can be managed in the remote copy pair table. The pair VOL ID may be referred to as an internal copy identifier. FIG. 9 shows a first internal copy identifier for the first storage system and a second internal copy identifier for the second storage system. The virtual mirror ID is a virtualized mirror ID and two remote copy pairs have the same virtual mirror ID. It is based on the same concept as that for the volume ID in the volume table of FIG. 7. The virtual mirror ID may be referred to as a virtual copy pair identifier. The server recognizes only one remote copy pair due to the same virtual mirror ID.

Figure 10:
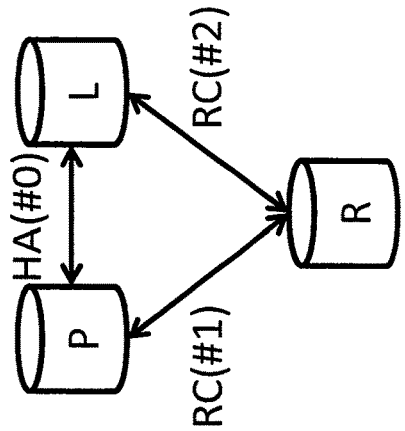
FIG. 10 shows an example of the remote copy pair table in the remote storage(R).

FIG. 10 shows an example of the remote copy pair table in the remote storage(R). It has similar columns and meanings as the examples of FIG. 9.

FIG. 11 is an example of the remote copy group table. The remote copy group is a unit of operation and consistency assurance for remote copy. The remote copy group table has columns of remote copy group ID, sequence number, VOL ID (internal ID), pair storage, and pair group ID. The remote copy group ID is an identification to identify the remote copy group in the storage. The sequence number is used to assure data consistency. When the storage receives the write request from the server, the storage obtains the sequence number and increments it. After the write data is transferred to the destination storage of remote copy, the storage(R) writes the write data to the destination volume in the order of the sequence number. In so doing, the data consistency is assured in the storage(R). When the remote copy transfers the data asynchronously, the sequence number is needed for data consistency. The VOL ID manages the list of the volumes included in the group specified by the remote copy group ID. The meaning of the pair storage is the same as that of the pair storage in the remote copy pair table of FIGS. 9 and 10. The pair group ID is a remote copy group ID to identify the remote copy group in the pair storage.

FIG. 12 shows an example of the HA group table. This table has columns of HA group ID, VOL ID (internal ID), pair storage, pair group ID, and IO pending Flag. The meanings of HA group ID, VOL ID, pair storage, and pair group ID are the same as those in the remote copy group table of FIG. 11. The IO pending flag manages whether the volume included in the group can execute the IO or not (yes if the IO pending flag is OFF). For example, the IO request is suspended during the pair status change to assure data consistency.

A. Virtualizing Remote Copy Pair

Figure 13:
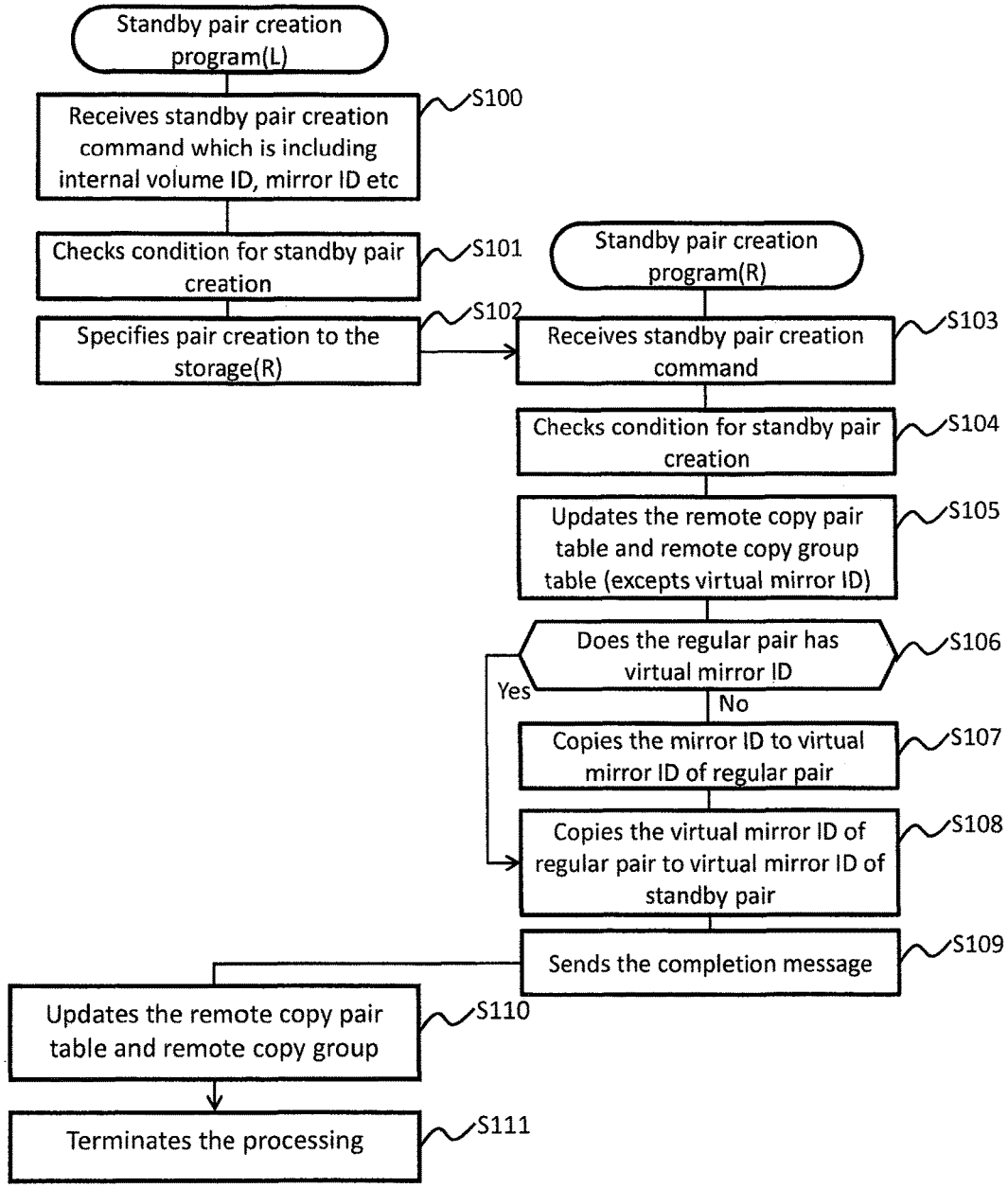
FIG. 13 is a flow diagram illustrating an example of the process of the standby pair creation program.

FIG. 13 is a flow diagram illustrating an example of the process of the standby pair creation program. This program creates a standby of remote copy pair between storage(L) and storage(R). In step S100, the program which is executed in the storage(L) receives a standby pair creation command from the management server or server. This command includes the internal volume IDs of the source volume and destination volume, mirror ID, remote copy group IDs, and pair storage information. Then, the program checks the condition(s) for standby pair creation (S101). The program specifies the pair creation to the storage(R) (S102). Notified information at step S100 are sent to the storage (R).

The standby pair creation program is executed in the storage(R) to perform the following procedure. The program receives the pair creation command from the storage(L) (S103) and checks the condition(s) for standby pair creation in the storage(R) (S104). For example, completion of regular pair creation between storage(P) and storage(R) is checked. Then the program updates the remote copy pair table and remote copy group table except for the virtual mirror ID field (S105). For the internal ID, pair storage, pair VOL ID, and mirror ID in the remote copy pair table, the notified information at step S103 is used. "Target" is stored in the copy attribute and "standby" is stored in the pair status. For the remote copy group ID, internal volume ID, pair storage, and pair group ID in the remote copy group table, notified information at step S103 is used. The sequence number area is initialized with "0". The program checks whether the regular pair has virtual mirror ID or not (S106). If the result is "yes", the program progresses to step S108. If the result is "no", the program copies the mirror ID of the regular pair to the virtual mirror ID field of the regular pair (S107). The process can be realized because the storage(R) has regular pair information between storage(P) and storage(R). To update the tables in the storage(P), the program can notify the update to the storage(P). Next, the program copies the virtual mirror ID of the regular pair to the virtual mirror ID of the standby pair (S108). Then, the program sends the completion message with virtual mirror ID to the storage(L) (S109).

The standby pair creation program which receives the completion from the storage(R) updates the remote copy pair table and remote copy group table (S110). For the internal ID, pair storage, pair VOL ID, and mirror ID in the remote copy pair table, the notified information at step S100 is used. "Source" is stored in the copy attribute and "standby" is stored in the pair status. For the remote copy group ID, internal volume ID, pair storage, and pair group ID in the remote copy group table, the notified information at step S100 is used. The sequence number area is initialized with "0". For the virtual mirror ID, the virtual mirror ID notified from the storage(R) is stored in the virtual mirror ID field. Finally, the program terminates the processing (S111).

Figure 14:
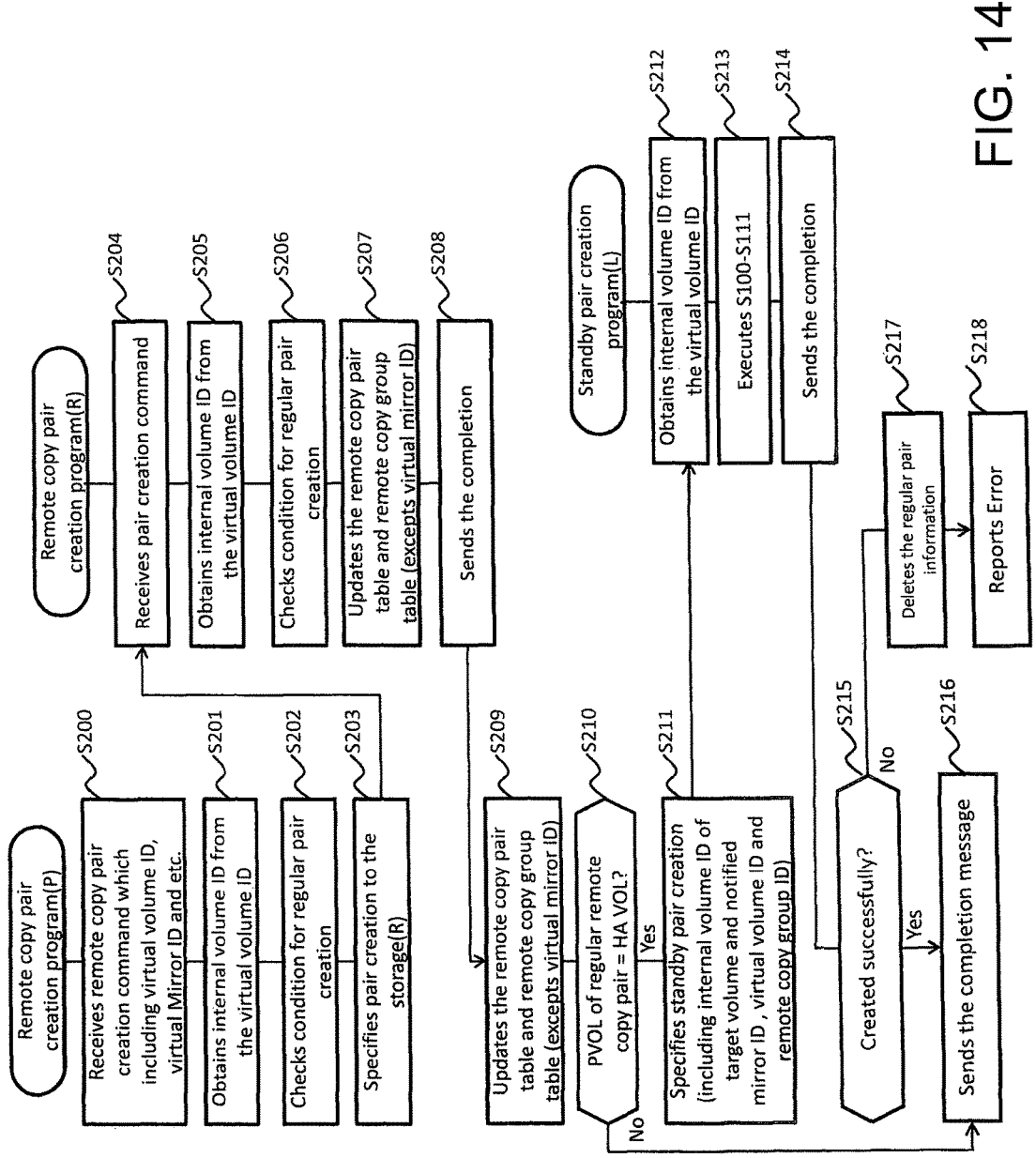
FIG. 14 shows a flow diagram illustrating an example of automated standby pair creation processing in which the regular remote copy pair is created after the HA pair creation.
Figure 15:
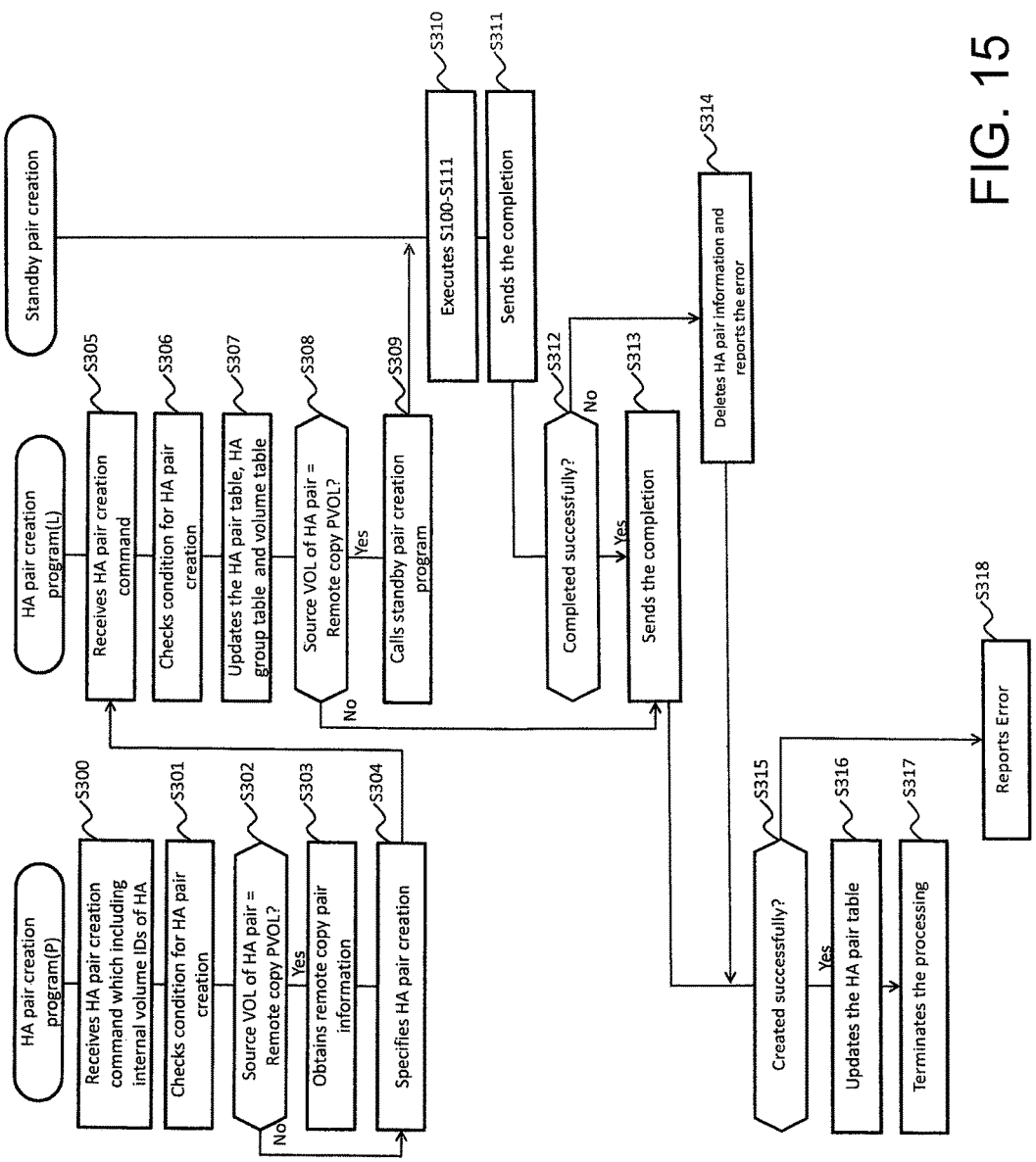
FIG. 15 shows a flow diagram illustrating an example of automated standby pair creation processing in which the HA pair is created after the remote copy pair creation.

FIG. 14 and FIG. 15 show flow diagrams illustrating examples of automated standby pair creation processing. In the standby pair creation process of FIG. 13, the storage administrator or user has to recognize the standby remote copy pair. When the regular remote copy pair is created after the HA pair creation, the automated standby pair creation method in FIG. 14 is executed. When the HA pair is created after the remote copy pair creation, the automated standby pair creation method in FIG. 15 is executed.

In FIG. 14 (the regular remote copy pair is created after the HA pair creation), the remote copy pair creation program in storage(P) receives a remote copy pair creation command (S200). This command includes the virtual volume IDs of source volume and destination volume of remote copy, virtual mirror ID, remote copy group IDs, and pair storage information. Only virtual volume is notified because the user recognizes virtual volume. The program creates regular remote copy pair in step S201-S209.

The program obtains the internal volume ID of the source volume from the notified virtual volume ID of the source volume (S201). The program checks the condition(s) for regular pair creation (S202) and specifies regular pair creation to the storage(R) (S203). The notified virtual volume ID of destination volume, notified mirror ID, obtained internal volume ID of source volume, and remote copy group IDs are sent to the storage(R). If the condition is not satisfied at step S202, error is reported to the user.

The remote copy pair creation program that is executed in the storage(R) receives the pair creation command from the storage(P) (S204) and obtains the internal volume ID of destination volume from the notified virtual volume ID of destination volume of remote copy (S205). After that, the program checks the condition(s) for regular pair creation (S206). Then, the program updates the remote copy pair table and remote copy group table except for the virtual mirror ID field (S207) and sends the completion message to the storage(P) with the internal volume ID obtained at step S205 (S208). If the condition is not satisfied, error is reported to the storage(P). For the pair storage, pair VOL ID, and mirror ID in the remote copy pair table, notified, information from the storage(P) is used. VOL ID is obtained at step S205. "Target" is stored in the copy attribute and "COPY" is stored in the pair status. For the remote copy group ID in the remote copy group table, the notified information from the storage(P) is used. The sequence number area is initialized with "0".

The remote copy pair creation program that is executed in the storage(P) and receives the completion message updates the remote copy pair table and remote copy group table in the storage(P) except for the virtual mirror ID (S209). If error is reported from the storage (R), the error is reported to the user. For the pair storage and mirror ID in the remote copy pair table, the notified information from the server is used. For the VOL ID, the VOL ID obtained at step S201 is used. For the pair VOL ID, internal volume ID which is notified from the storage(R) at step S209 is used. "Source" is stored in the copy attribute and "COPY" is stored in the pair status. For the remote copy group ID in the remote copy group table, the notified information from the server is used. The sequence number area is initialized with "0". Then, the program executes the step in order to create the standby remote copy pair. The program checks whether specified the source volume of remote copy consists of HA pair or not (S210). If the result is "no", the program proceeds to step S216 and sends the completion message to the server. If the result is "yes", the program specifies standby pair creation to the storage(L). This command includes the internal volume ID of target volume of remote copy and the notified virtual volume ID of source volume, notified mirror ID, and remote copy group IDs.

The remote copy pair creation program that is executed in the storage(L) receives the specification from the storage(P) and obtains the internal volume ID of source volume from the notified virtual volume ID of source volume of remote copy (S212). Then, the program executes the processing to create the standby remote copy pair (S213). The steps involved in S213 are the same as steps S100-S111 in FIG. 13. After that, the program sends the completion message to the storage(P) (S214).

The remote copy pair creation program that is executed in the storage(P) and receives the completion message from step S214 in the standby pair creation program and checks whether the standby pair is created successfully or not (S215). If the result is "yes", the program sends the completion message to the user (S216). If the result is "no", the program deletes the regular pair created in steps S201-S209 from the remote copy pair table and remote copy group table (S217). The deletion is notified to the storage(R) and executed in the storage(R). Finally, the program reports the error message to the server (S218).

In this example, when the creation of standby remote copy pair fails, the regular remote copy pair is not created. However, the method which completes creation of only regular remote copy pair can be considered. It is assumed to assign the same remote copy group ID which is specified from the user in the storage(P) and storage(L). However, different remote copy group ID can be used in the storage(P) and storage(L) by using same technique as virtual volume ID.

The storage(R) has virtual volume ID in example mentioned above. However, the storage(R) does not constitute HA configuration. It is not necessary to achieve this invention. Internal VOL ID can be used in the pair creation method. The virtual volume ID in the storage(R) can be same as internal ID in the storage(R).

In FIG. 15 (the HA pair is created after the remote copy pair creation), the HA pair creation program in storage(P) receives HA pair creation command (S300). The program creates the HA pair in step S301-S307 and S316. This command includes the internal volume IDs of source volume and destination volume of HA pair, mirror ID for HA pair, HA group IDs, and pair storage information. The program checks the condition(s) for HA pair creation (S301). If the condition is not satisfied, error is reported to the user. If the condition is satisfied, the program checks whether the remote copy is applied to the source volume of HA or not (S302). If the result is "no", the program skips step S303 and proceeds to step S304. If the result is "yes", the program obtains remote copy pair information (S303). After that, the program specifies HA pair creation to the storage(L) (S304). With this specification, the internal volume ID of HA source volume and destination volume, internal volume ID of remote copy destination volume, remote copy group IDs, mirror ID of remote copy, mirror ID of HA, result of step S302, and virtual volume ID of HA source volume are sent to the storage(L). The internal volume ID of remote copy destination volume, remote copy group IDs, and mirror ID of remote copy are obtained at step S303. The virtual volume ID of HA source volume is obtained by accessing the volume table (see FIG. 7).

The HA pair creation program executed in the storage(L) receives the pair creation command from the storage(P) (S305), checks the condition(s) for HA pair creation (S306), and updates the HA pair table, HA group table, and volume table (S307). The notified virtual volume ID and internal volume ID of HA destination volume are added to the volume table. Then, the program checks whether the remote copy is applied to the source volume of HA or not (S308). If the result is "no", the program proceeds to step S313 and sends the completion message to the storage(P) (S313). If the result is "yes", the program calls the standby pair creation program (S309). The standby pair creation program executes the processing to create the standby remote copy pair (S310). The steps for S310 are the same as step S100-S111 in FIG. 13. The received internal volume IDs of remote copy source and destination, remote copy group IDs, and mirror ID of remote copy are notified to the standby pair creation program. After completion of the standby pair creation program (S311), the HA pair creation program checks whether the standby pair is created successfully or not (S312). If the result is "yes", the program sends the completion message to the storage(P) (S313). If the result is "no", the program deletes the HA pair and reports the error (S314).

The HA pair creation program that is executed in the storage(P) and receives the completion message from the storage(L) checks whether the HA pair is created successfully or not (S315). If the result is "yes", the program updates the HA pair table (S316) and sends the completion message to the user (S317). If the result is "no", the program reports error to the user (S318).

In this example, when the creation of standby remote copy pair fails, the HA pair is not created. However, the method which completes only the HA pair can be considered. The standby remote copy pair creation is automated by using the method mentioned above. The user does not need to recognize the standby remote copy pair in the remote copy pair creation. Then, the method for which the user does not need to recognize the standby remote copy pair in the pair operation is described. To realize this, the storage detects the regular remote copy pair and executes the operation to the detected remote copy pair. When the storage having the standby pair receives the operation, the operation command transfer may be needed.

Figure 16:
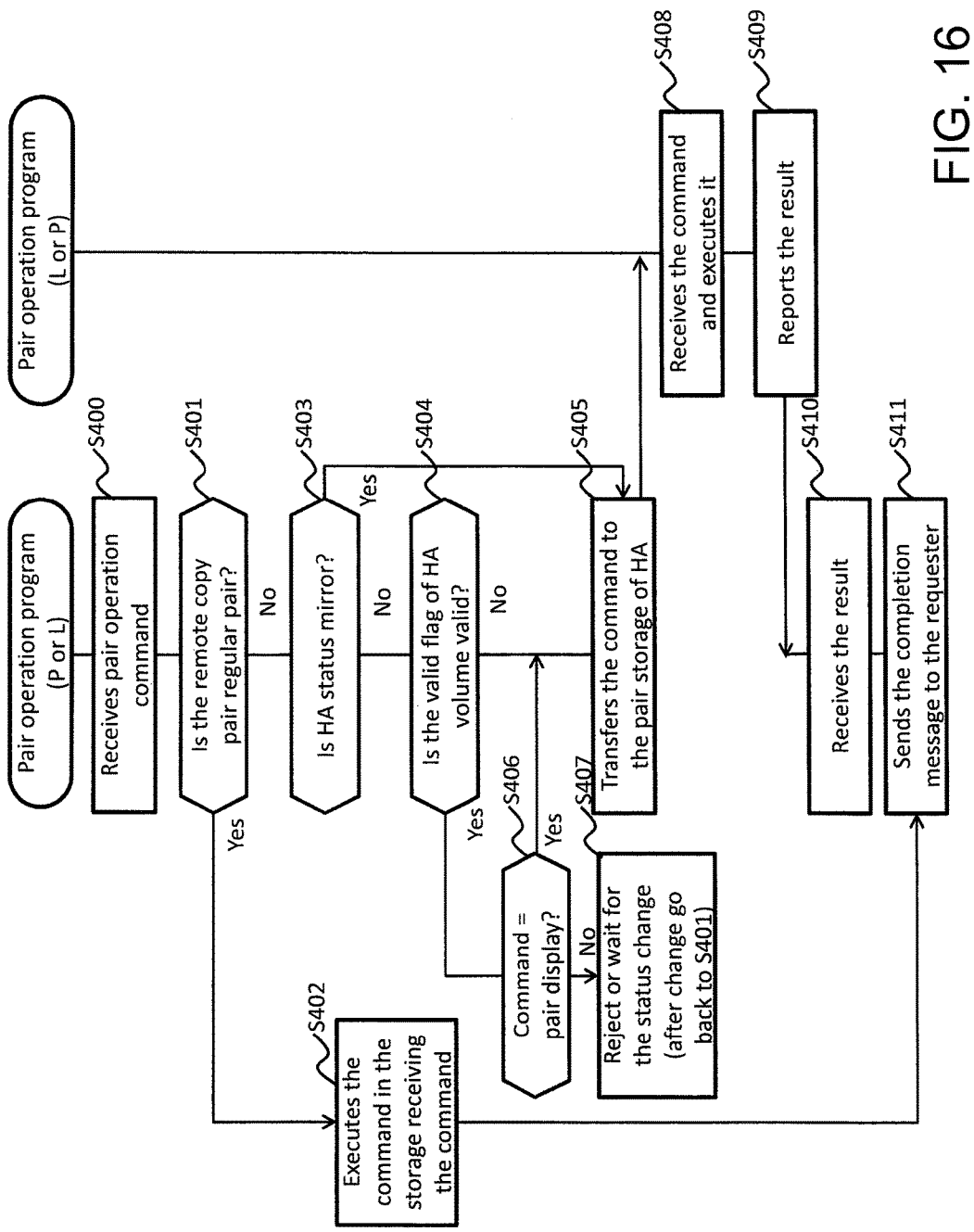
FIG. 16 shows a flow diagram illustrating an example of the process of the pair operation program which is executed in the primary storage(P) or local storage(L).

FIG. 16 shows a flow diagram illustrating an example of the process of the pair operation program which is executed in the primary storage(P) or local storage(L). The pair operation program receives a pair operation command, such as pair status display, pair suspend, or the like (S400). Then, the program checks whether the remote copy pair is regular pair (S401). If the result is "yes", the program executes the command in the storage receiving the pair operation command at step S402 and sends the completion message to the requester (S411). In this case, because the storage which receives the command has the regular remote copy pair, the storage executes the pair operation command itself. If the result is "no", the program checks whether the HA pair status is mirror (S403). If the result is "yes", the program transfers the pair operation command to the pair storage of HA (S405), because the pair storage of HA has the regular remote copy pair. Next, the pair storage of HA executes the pair operation program. The program receives the command and executes it (S408) and reports the result to the other storage (S409). The pair operation program of that storage receives the result from the pair storage of HA (S410) and sends the completion message to the server (S411).

If the result of step S403 is "no", the program checks whether the valid flag of HA volume is valid (S404). If the result is "no", the program proceeds to step S405 and then S408-S411, because the volume of HA in the storage which received the pair operation command is not the newest. When the HA pair is suspended, the IO request is continued in the volume with valid status. Thus, the volume with the valid status has newest data. If the result of step S404 is "yes", the program proceeds to step S406. The volume having standby remote copy pair status and valid status of HA is in the transient state just before execution of the automated resync processing explained later. After execution of the resync processing, the regular pair and standby pair will be exchanged. If the pair operation command is pair status display, the command can be executed by transferring the pair storage of HA, because the pair status display does not change the remote copy pair status.

The pair suspend and pair delete command, however, changes the pair status. The changing the pair status may affect the automated resync processing which will be automatically executed. Thus, the pair suspend and pair delete command should wait for the status change or should be rejected. If the result of step S406 is "yes", the program proceeds to step S405 and transfers the command, as described above. If the result of step S406 is "no", the program rejects the command or waits for the status change (S407). After status change, the program goes back to step S401 and executes the steps.

Figure 17:
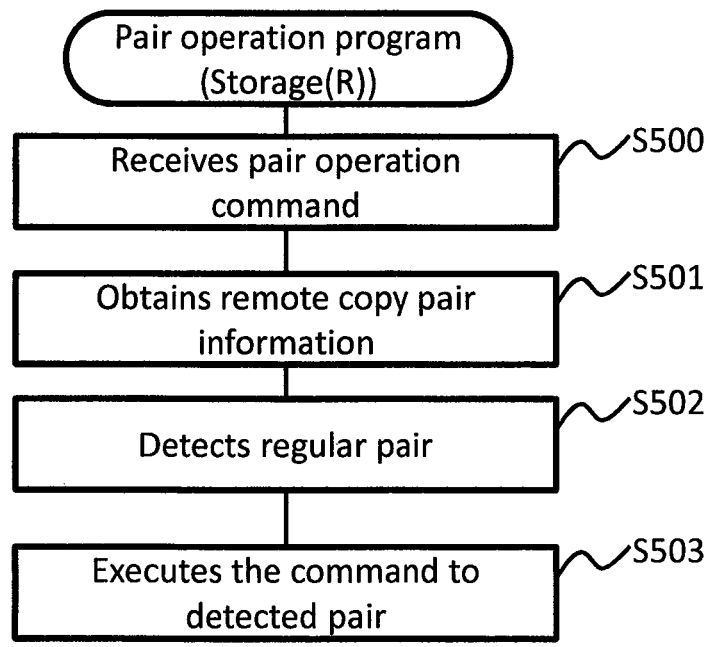
FIG. 17 shows a flow diagram illustrating an example of the process of the pair operation program which is executed in the storage(R).

FIG. 17 shows a flow diagram illustrating an example of the process of the pair operation program which is executed in the storage(R). The storage(R) has information of both the regular pair and the standby pair. The pair operation program which is executed in the storage(R) receives the pair operation command (S500). Then, the program obtains the remote copy pair information from the remote copy pair table (S501) and detects the regular pair by checking the pair status information (S502). After that, the program executes the pair operation command to the detected regular pair (S503). The user does not need to recognize the standby remote copy pair in the remote copy pair operation.

In the active-active configuration, IO from the server is not rejected after the storage(P) failure. The IO is processed in the storage(L). Thus, the standby remote copy pair should be a regular pair. Since the server cannot recognize the storage(P) failure, the storage has to change the remote copy pair after failure. The changing process from standby remote copy to regular remote copy is called resync processing between the storage(L) and storage(R). The methods in each failure case are described herein below.

B. Failure Cases

B(1). Storage(P) Failure

In this case, the storage(L) notices the storage(P) failure because the storage(L) cannot communicate with the storage (P). Then, the storage(L) checks whether the storage(L) can continue the IO request from the server. These processing are described in FIG. 18. After that, the storage(L) changes the remote copy pair status between storage(L) and storage (R) from standby to regular. This is described in FIG. 19.

Figure 18:
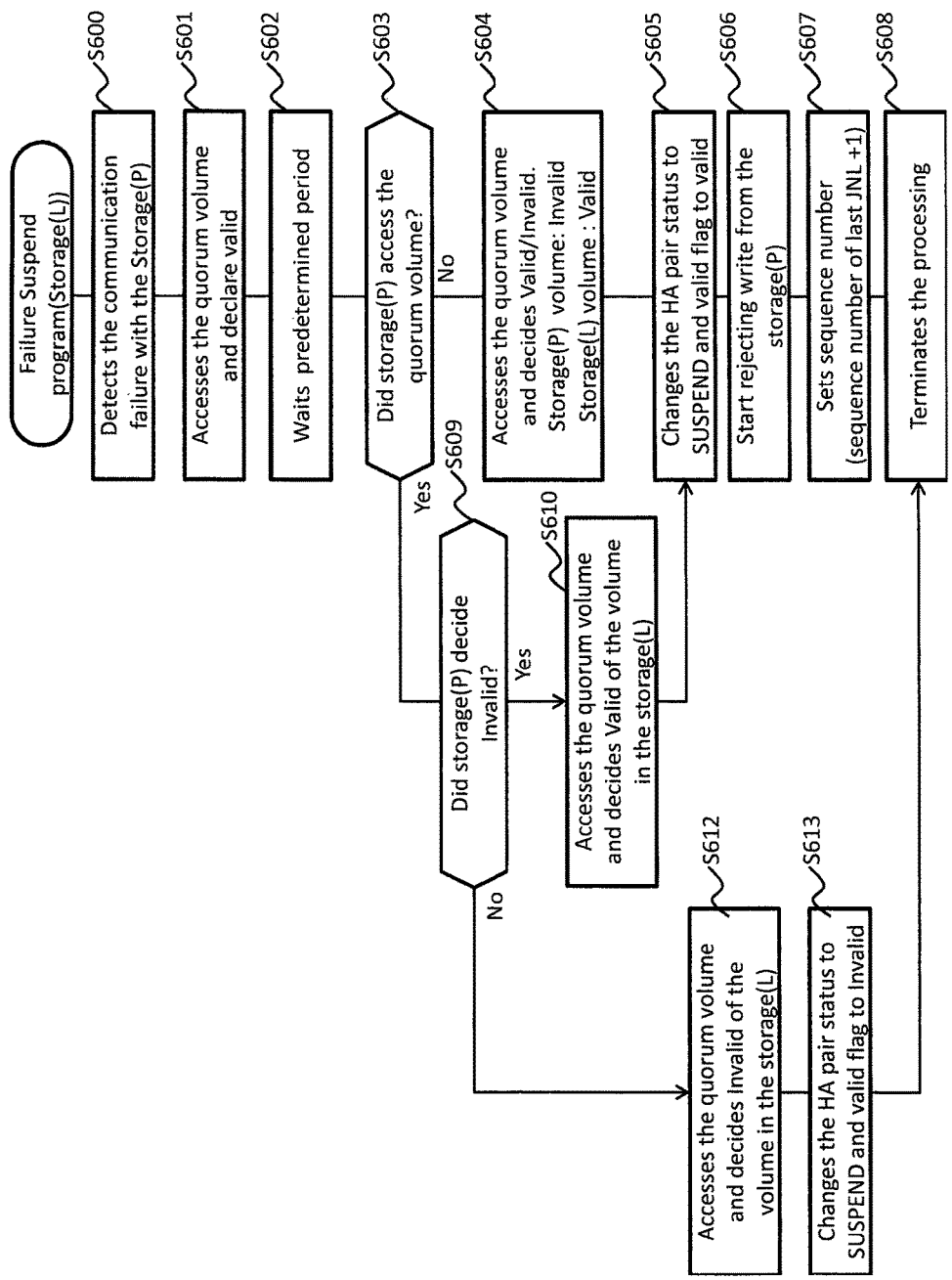
FIG. 18 shows a flow diagram illustrating an example of the process of the failure suspend program executed in the storage(L).

FIG. 18 shows a flow diagram illustrating an example of the process of the failure suspend program executed in the storage(L). First, the failure suspend program detects the communication failure with the storage(P) (S600). Then, the program accesses the quorum disk and declares to be valid (S601) and waits for a predetermined period (S602). After that, the program checks whether the storage(P) accessed the quorum disk or not (S603). If the storage(P) has not accessed the quorum disk, the program decides that the storage(P) has failed. Thus, the program decides that the storage(P) becomes invalid and the storage(L) becomes valid status (S604). Then, the program suspends the HA pair and changes the valid flag in the storage(L) to valid (S605). The program starts rejecting write from the storage(P) (S606) and sets the sequence number assigned to the new IO request issued to the storage(L) (S607). If the path from the storage (L) to the storage(P) and the path from the storage(P) to the quorum disk have failed, the storage(P) can continue the processing. Therefore, step S606 is needed before step S607. Finally, the program terminates the processing.

If the result of step S603 is "yes", the program checks whether the storage(P) decides it is invalid or not (S609). If the result is "yes", it means that the storage(P) accesses the quorum disk and declares to be invalid. The program declares that the storage(L) becomes valid status to the quorum disk (S610). After that, the program proceeds to step S605 which has already been described. If the result of step S609 is "no", it means that the storage(P) accesses the quorum disk and declares to be valid. Then, the program accesses the quorum disk and decides to be invalid (S612). The program suspends the HA pair and changes the valid flag in the storage(L) to invalid (S613). Finally, the program terminates the processing. In the case mentioned above, when both of the storage(P) and storage(L) declare to be valid, the storage(L) becomes the invalid and the storage(P) becomes valid. However, some other information can be used for making the decision.

Figure 19:
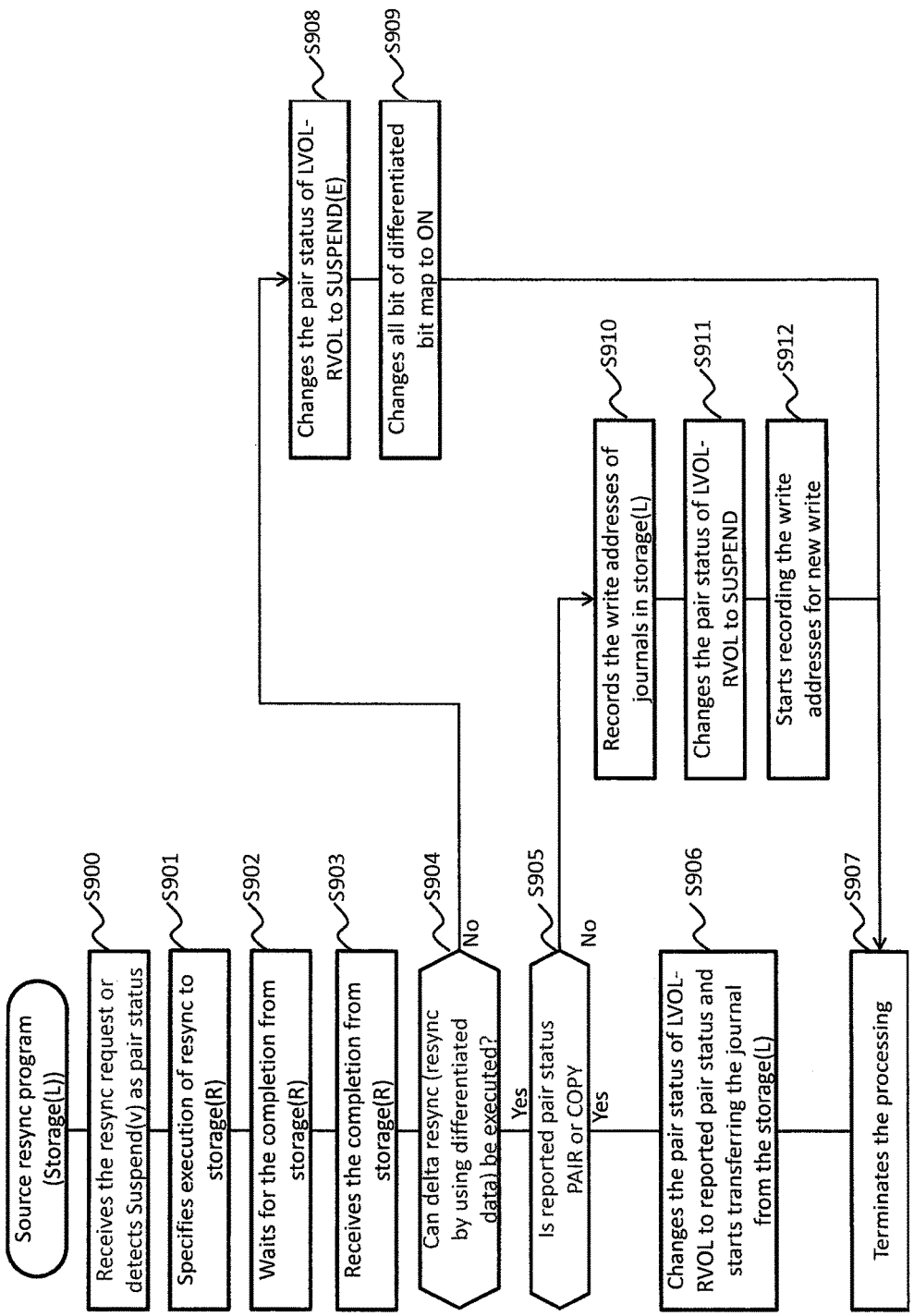
FIG. 19 shows a flow diagram illustrating an example of the process of the source resync program which is executed in the storage(L).

FIG. 19 shows a flow diagram illustrating an example of the process of the source resync program which is executed in the storage(L). First, the source resync program receives the resync request or detects that HA pair is suspended and the pair of LVOL is changed to Suspend(v) (S900). The suspension of the HA pair is detected after the processing of the failure suspend program as shown in FIG. 18. Then, the program specifies execution of resync to the storage(R) (S901) and waits for the completion from the storage(R) (S902). The target resync program will be executed in the storage(R).

Figure 20:
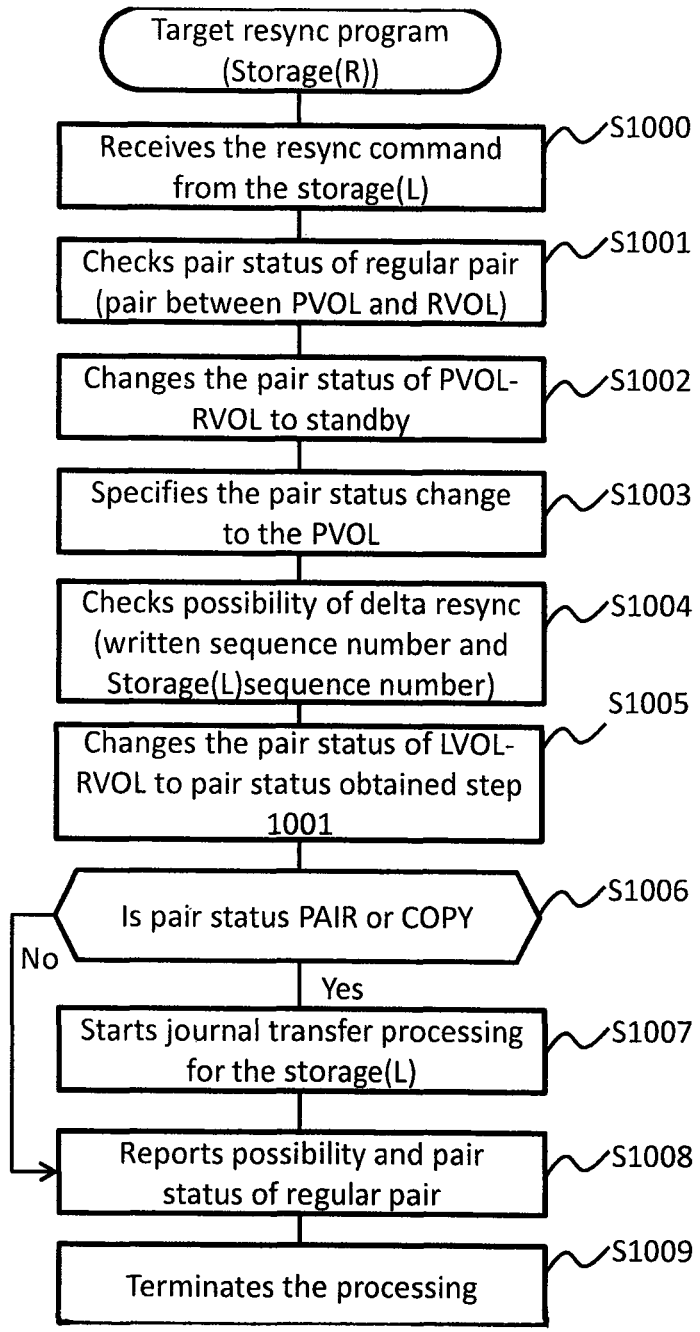
FIG. 20 shows a flow diagram illustrating an example of the process of the target resync program which is executed in the storage(R).

FIG. 20 shows a flow diagram illustrating an example of the process of the target resync program which is executed in the storage(R). First, the target resync program receives the resync command from the storage(L) (S1000) and checks the pair status of the regular pair (i.e., between PVOL and RVOL pair) (S1001). Then, the program changes the pair status of the regular pair to standby status (S1002) and specifies the pair status change to the storage(P) (S1003). The storage(P) which receives the specification changes the status in the storage(P). The explanation of the processing is omitted in the figure. After that, the program in the storage (R) checks for the possibility of delta resync (S1004). The delta resync processing is a resynchronization processing by using differential data between the storage(L) and storage (R). If the delta resync processing cannot be executed, all data stored in the volume in the storage(L) will be transferred to the volume in the storage(R). For example, the maximum sequence number of the journals written to the volume in the storage(R) is smaller than the minimum sequence number of the journals which are stored in the journal volume in the storage(L). This is a one of the conditions. Then, the program changes the pair status of the remote copy pair between the storage(L) and the storage(R) (i.e., between LVOL and RVOL) (S1005). This means that the remote copy pair between the storage(L) and the storage (R) takes over the pair status of remote copy pair between the storage(P) and the storage (R). Next, the program checks the pair status (S1006). If the pair status is PAIR or COPY, the program starts journal transfer processing from the storage(L) to the storage(R) (S1007), reports the possibility of delta resync and the pair status of the regular pair (S1008), and terminates the processing (S1009). If the pair status is not PAIR or COPY, the program skips step S1007, reports the possibility of delta resync and the pair status of the regular pair (S1008), and terminates the processing (S1009).

Returning to the process of FIG. 19, the program which receives the completion from the storage(R) (S903) checks whether delta resync processing can be executed or not (S904). If the result is "yes", the program checks whether the reported pair status is PAIR or COPY (S905). If the reported pair status is PAIR or COPY, the program changes the pair status of the remote copy pair between the storage(L) and storage(R) to the reported pair status and starts transferring the journal from the storage(L) to storage(R) (S906). Finally the program terminates the processing (S907). If the result of step S904 is "no", it means delta resync cannot be executed. The program changes the pair status of remote copy pair between storage(L) and storage(R) to SUSPEND (E) (S908) and changes all bits of differentiated bitmap of the remote copy to ON (S909). SUSPEND(E) means suspend status caused by error. By setting all bits of the differentiated bitmap to ON, all the data in the volume in the storage(L) will be copied when the resync is executed by the user.

If the reported pair status is SUSPEND in step S905, the program records the write addresses of journals stored in the journal volume in the storage(L) (S910) and changes the pair status of remote copy pair between the storage(L) and storage(R) to SUSPEND (S911). Then, the program starts recording the write addresses for new write request from the server (S912). Finally, the program terminates the processing (S907)

B(2). Volume in Storage(P) Failure or Path Between Storage(P) and Storage(R) Failure In this case, the storage(P) notices the volume failure in the storage(P) or path failure between the storage(P) and storage(R), and notifies it to the storage(L). The storage(L) takes over the source processing of remote copy.

Figure 21:
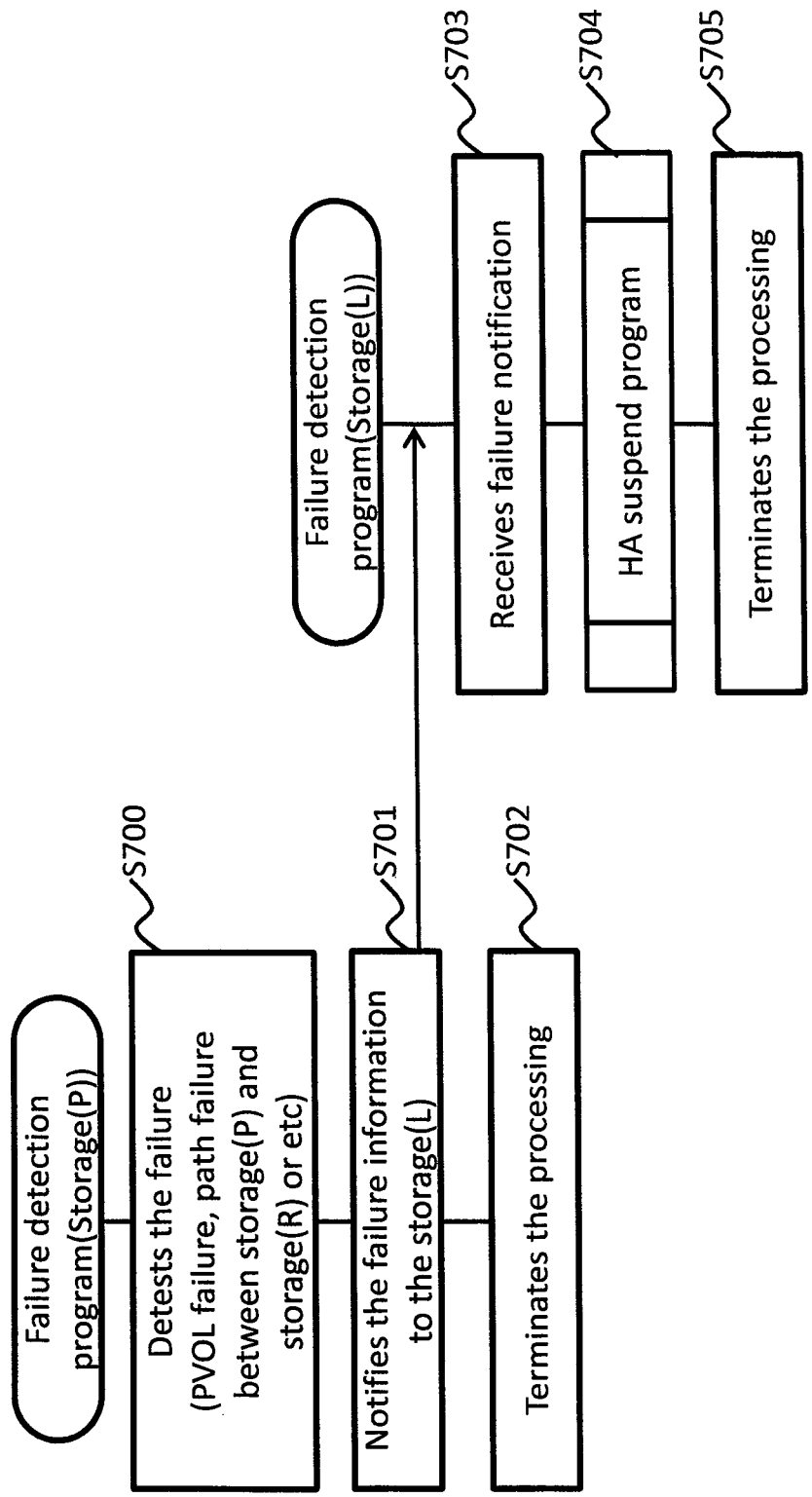
FIG. 21 shows a flow diagram illustrating an example of the process of the failure detection program in the storage(P) and the storage(L).

FIG. 21 shows a flow diagram illustrating an example of the process of the failure detection program in the storage(P) and the storage(L). The failure detection program which is executed in the storage(P) detects the failure of PVOL or path between the storage(P) and storage(R) (S700). The program notifies the failure information to the storage(L) (S701) and then terminates the processing (S702). The storage(L) which receives the notification from the storage (P) executes the failure detection program. After receiving the failure notification (S703), the program executes the HA suspend program (see FIG. 22) (S704) and terminates the processing (S705).

Figure 22:
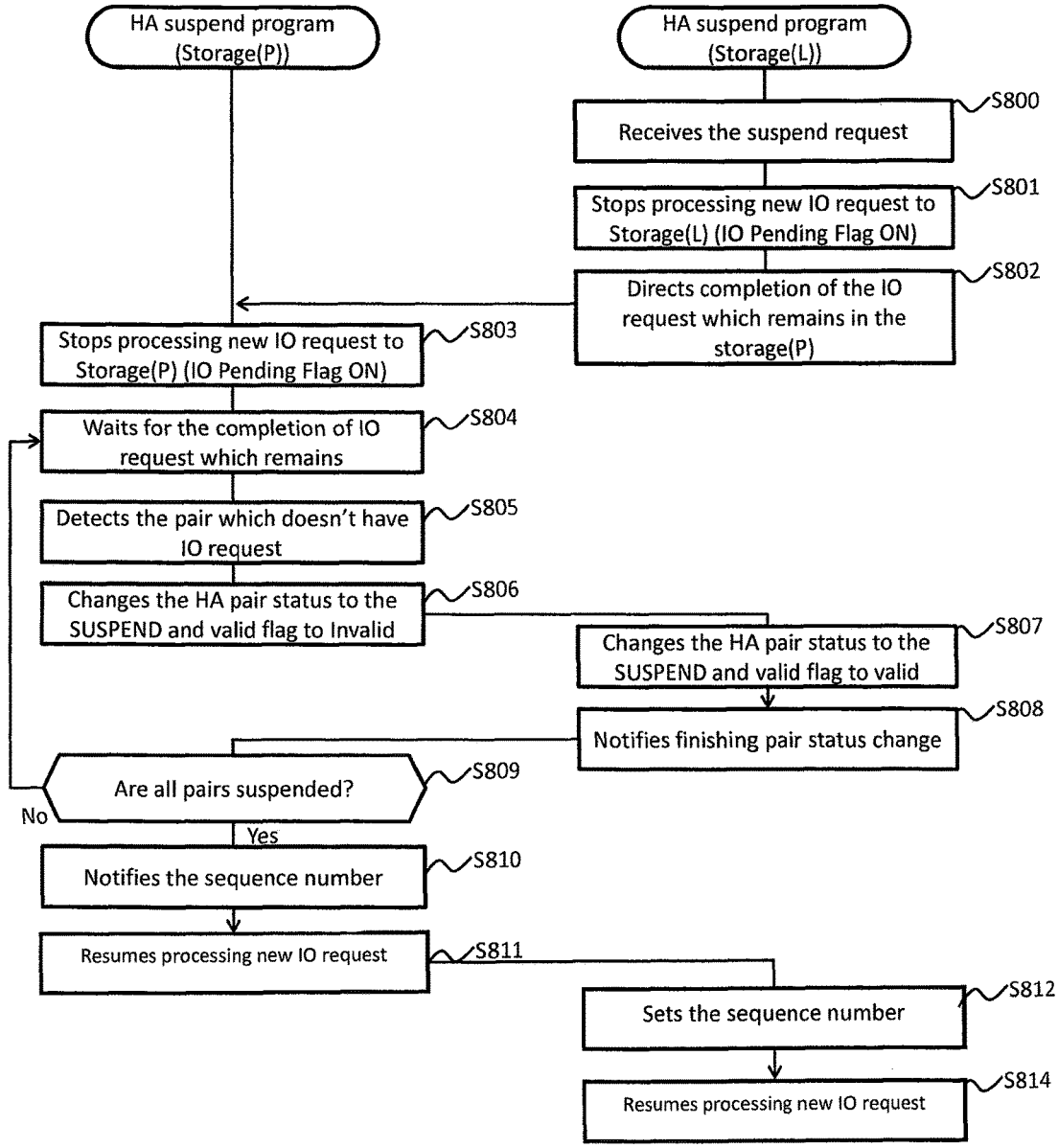
FIG. 22 shows a flow diagram illustrating an example of the process of the HA suspend program.

FIG. 22 shows a flow diagram illustrating an example of the process of the HA suspend program. The HA suspend program executed in the storage(L) receives the suspend request from another program or user (e.g., step S704 in FIG. 21) (S800). The program stops processing new IO request from the server to the storage(L) (S801). In particular, the program changes the IO pending flag to ON. The IO program checks the flag before starting the processing, as described later. In this invention, the storage has IO pending flag for the HA group. The method in which the storage has the flag or each pair has the flag can be considered. To take over the source processing of remote copy, the storage(L) has to take over the sequence number from the storage(P). In order to take over the sequence number consistently, the IO request needs to be suspended while taking over the sequence number. Then, the program directs completion of the IO request which remains in the storage(P) (S802), because the storage(P) is receiving the new IO request from the server.

The HA suspend program which is executed in the storage(P) stops processing new IO request to the storage(P) (S803). In particular, the program changes the IO pending flag to ON in the storage(P). Then, the program waits for the completion of IO request which remains in the storage(P) (S804). The program monitors and detects the pair which does not have IO request which remains (S805). After the detection, the program changes the HA pair status to the SUSPEND and valid flag in HA pair table to invalid (S806). In this case, the volume in the storage(L) will continue with IO request. Thus, invalidity of the volume in the storage(P) can be decided at step S806. The program notifies the pair status change to change the information in the HA pair table in the storage(L). At step S807, the HA suspend program in the storage(L) changes the HA pair status to SUSPEND and the valid flag in HA pair table to valid (S807). The program notifies the storage(P) of the completion of the pair status change (S808).

The HA suspend program in the storage(P) which receives the notification from step S808 checks whether all pairs in the HA groups are suspended (S809). If all pairs are not suspended, the program goes back to step S804. If all pairs are suspended, the program obtains the sequence number from the remote copy group table and notifies it to the storage(L) (S810). The program in the storage(L) sets the sequence number to the remote copy group table (S812). Finally, the storage(P) and storage(L) resume processing new IO request (S811 and S814). In particular, the program changes the IO pending flag to OFF. IO processing is described later.

After suspension of the HA pair, the source resync program detects the suspension and resync the remote copy pair between the storage(L) and storage(R). Finally, the IO request from the server is processed in the storage(L) and remote copy processing is continued between the storage(L) and storage(R).

Figure 23:
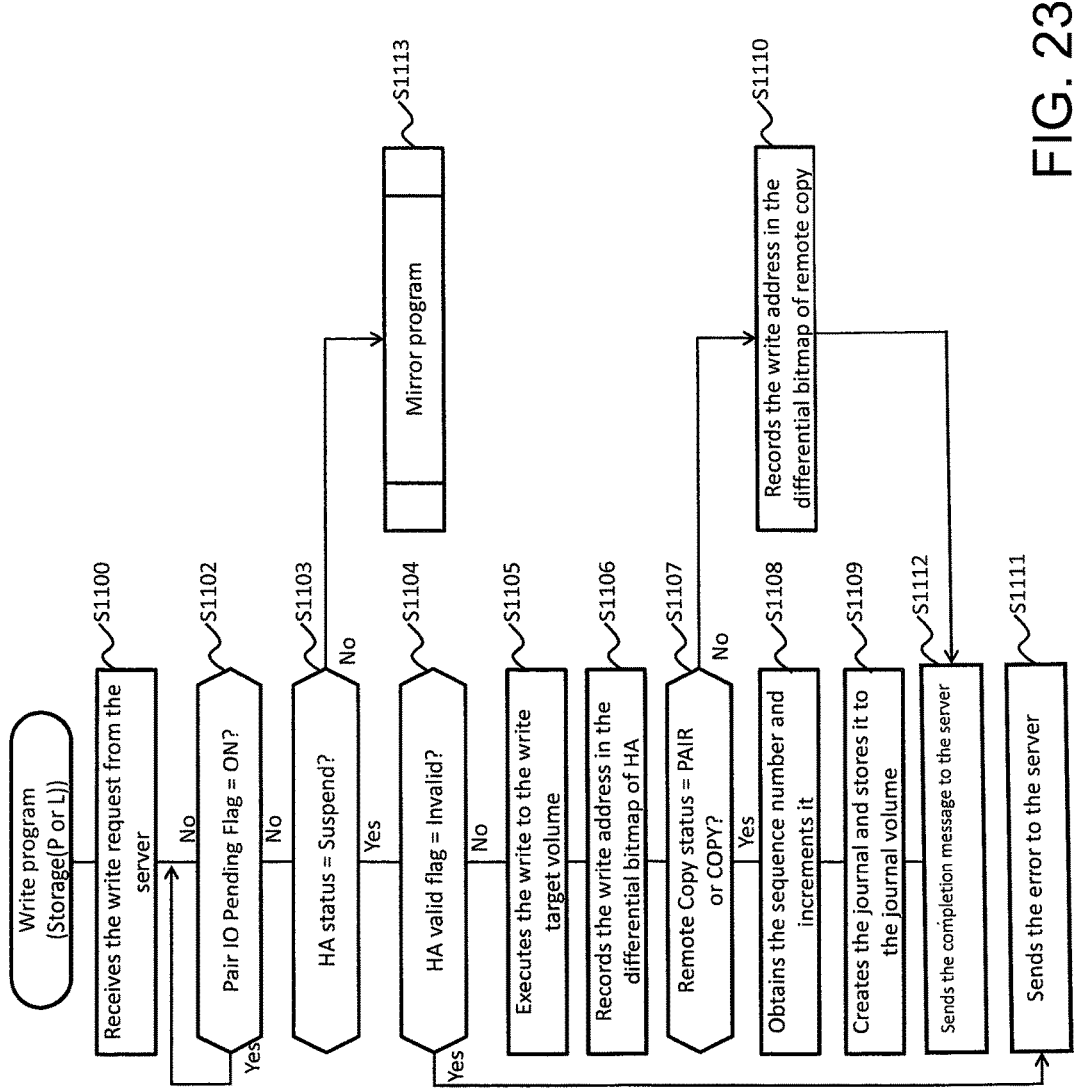
FIG. 23 shows a flow diagram illustrating an example of the process of the write program checking the IO pending flag which is set by the HA suspend program.

FIG. 23 shows a flow diagram illustrating an example of the process of the write program checking the IO pending flag which is set by the HA suspend program. The write program receives the write request from the server (S1100) and checks whether the IO pending flag is ON (S1102). If the IO pending flag is ON, the program does not proceeds to the next step and executes step S1102 again after a predetermined period. The program will release the processor resource. If the IO pending flag is OFF, the program checks whether the HA status is SUSPEND (S1103). If the HA status is PAIR or COPY, the program calls the mirror program (S1113) (see FIG. 24). If the HA status is SUSPEND, the program checks whether the HA valid flag is invalid (S1104). If the HA valid flag is invalid, the program proceeds to step S1111 and sends the error notification to the server (S1111). The method in which the program transfers the write request to the pair volume of HA can be considered. In that case, the write request is executed in the pair volume whose valid flag may be valid. After execution, the program sends the completion to the server.

Otherwise, if the HA status valid flag is valid, the program executes the write request to the target volume (S1105) and records the write address in the differential bitmap of the HA pair (S1106), because the HA is suspended and the pair may be resynchronized by using the bitmap information. Then, the write program checks the remote copy pair status (S1107). If the remote copy pair status is SUSPEND, the program records the write address in the differential bitmap of remote copy (S1110) and sends the completion message to the server (S1112). The bitmap is used to resynchronize the remote copy pair. If the pair status is PAIR or COPY, the program obtains the sequence number and increments it (S1108). Then, the program creates the journal and stores it to the journal volume (S1109) and sends the completion message to the server (S1112). The journal has journal data to be transferred to the storage(R) for data replication. The journal volume is a volume to store the journal data temporarily. After storing the write data to the volume in the storage(R), the journal is deleted from the journal volume. When the HA pair status is PAIR, the mirror program is called from the write program.

Figure 24:
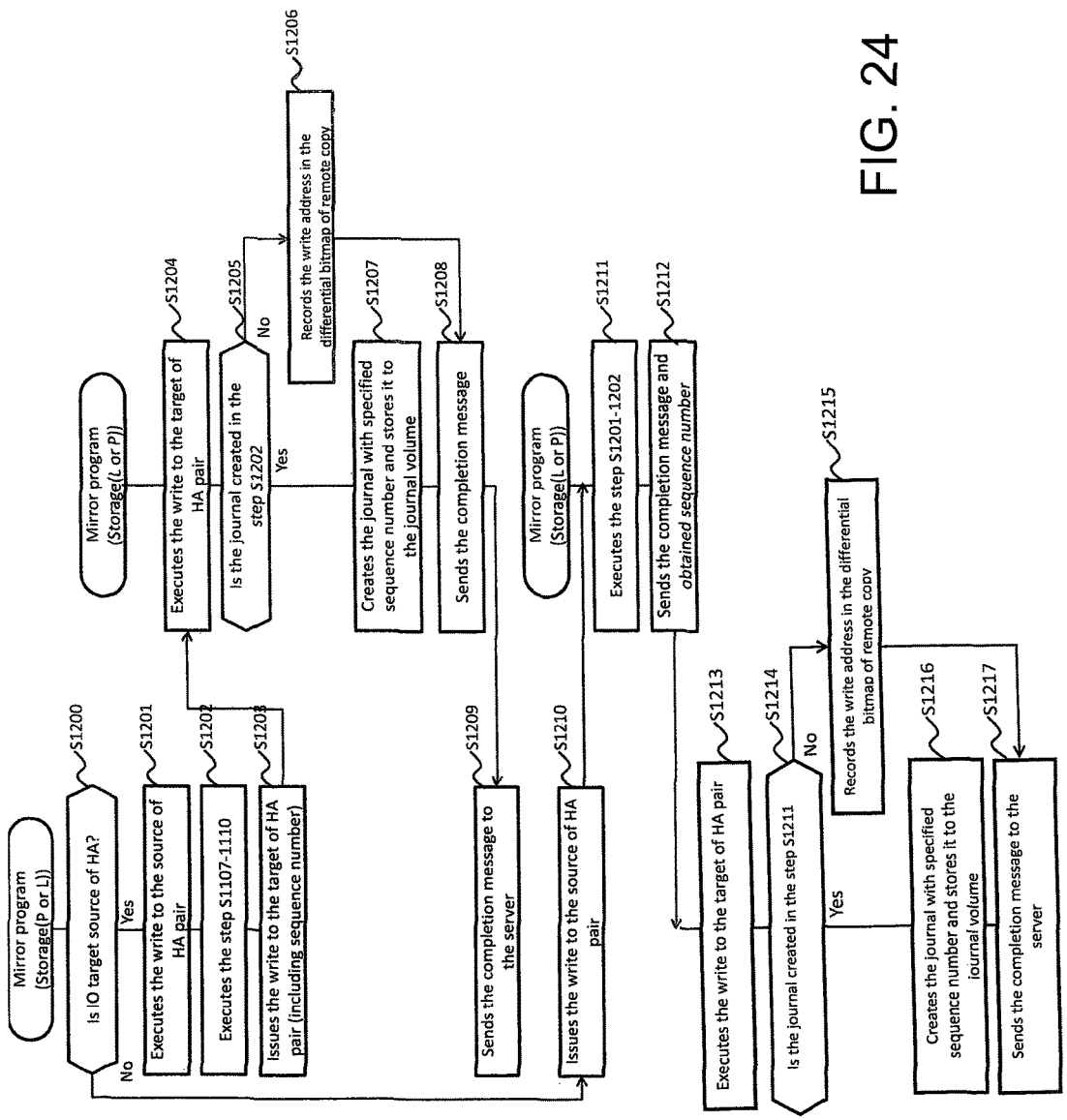
FIG. 24 shows a flow diagram illustrating an example of the process of the mirror program.

FIG. 24 shows a flow diagram illustrating an example of the process of the mirror program. First, the mirror program checks the copy attribute of the HA pair (S1200). If the copy attribute is source (i.e., IO target is the source of the HA pair), the program executes the write to the source volume of the HA pair (S1201) and executes the same steps as S1107-S1110 in FIG. 23 (S1202). These steps check the remote copy pair status and execute the journal creation process or bitmap recoding according to the pair status. Then, the program issues the write to the target volume of HA pair in the storage(L) (S1203). If the journal is created in step S1202, the assigned sequence number is included in the write command to the storage(L).

In the storage(L), the mirror program is executed. The program executes the write to the target volume of the HA pair (S1204). Then, the program checks whether the journal was created in step S1203 (S1205). If the journal was created, the mirror program creates the journal with the specified sequence number from the storage(P) and stores it to the journal volume in the storage(L) (S1207). If the journal was not created, the mirror program records the write address in the differential bitmap of remote copy in the storage(L) (S1206). After step S1206 or S1207, the program sends the completion message to the storage(P) (S1208). The mirror program in the storage(P) receives the completion message from the storage(L) and sends the completion message to the server (S1209).

If the copy attribute is target (i.e., IO target is the target of the HA pair) in step S1200, the program issues the write to the source volume of HA pair in the storage(L) (S1210). In the storage(L), the mirror program is executed. The program executes the same steps as S1201 and S1202 (S1211). These steps check the remote copy pair status and execute the journal creation process or bitmap recoding according to the pair status. After that, the program sends the completion message to the storage(P) with the obtained sequence number (S1212). The mirror program which receives the completion message from the storage(L) executes the write to the target volume of HA pair (S1213). Then, the program checks whether the journal was created in step S1211 (S1214). If the journal was created, the mirror program creates the journal with the specified sequence number from the storage(L) and stores it to the journal volume in the storage(P) (S1216). If the journal was not created, the mirror program records the write address in the differential bitmap of remote copy in the storage(P) (S1215). After step S1215 or S1216, the program sends the completion message to the server (S1217).

B(3). Path Between Storage(P) and Storage(R) Failure (Second Method)

With the method mentioned above, the HA pair is suspended when path failure occurs. Another method to take over the remote copy processing without HA pair suspension is described here. Failure detection program, write program, mirror program are changed for this second method.

Figure 25:
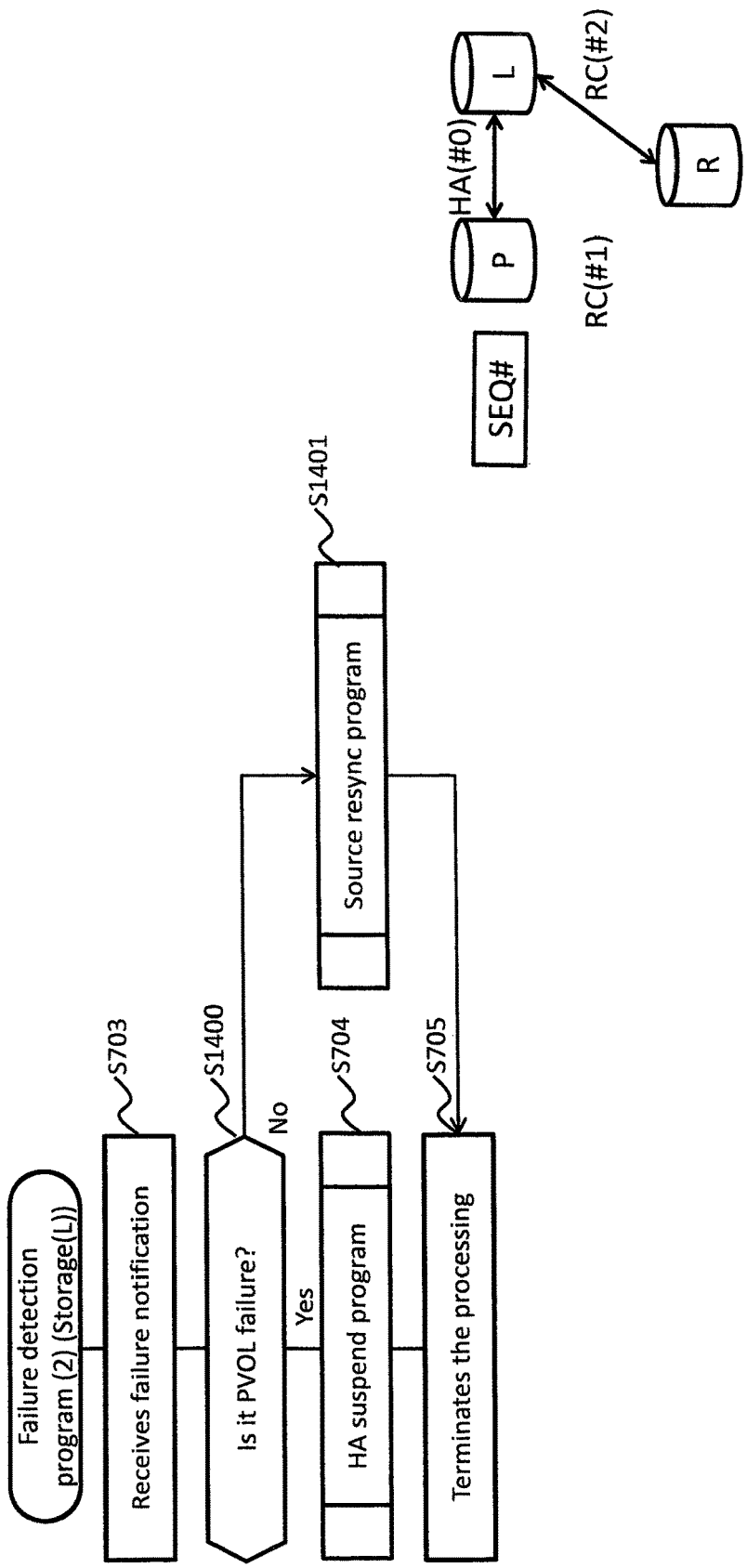
FIG. 25 shows a flow diagram illustrating another example of the process of the failure detection program which is executed in the storage(L).

FIG. 25 shows a flow diagram illustrating another example of the process of the failure detection program which is executed in the storage(L). It is called failure detection program (2). Steps S1400 and S1401 are new steps as compared to FIG. 21. After receiving the failure notification from the storage(P) (S703), the failure detection program (2) checks whether it is failure of HA volume in the storage(P) (S1400). If the result is "yes", the steps described in FIG. 22 for the HA suspend program is executed (S704). If the result is "no", the failure detection program (2) calls the source resync program (S1401) and terminates the processing (S705). The source resync program described in FIG. 19 is called from step S1401. After the execution of the resync program, the HA pair is not changed, the sequence number of the remote copy is assigned in the storage(P), and the remote copy pair between the storage(L) and storage(R) is the regular pair. This is a new configuration. Therefore, the write request processing is changed (see FIG. 26).

Figure 26:
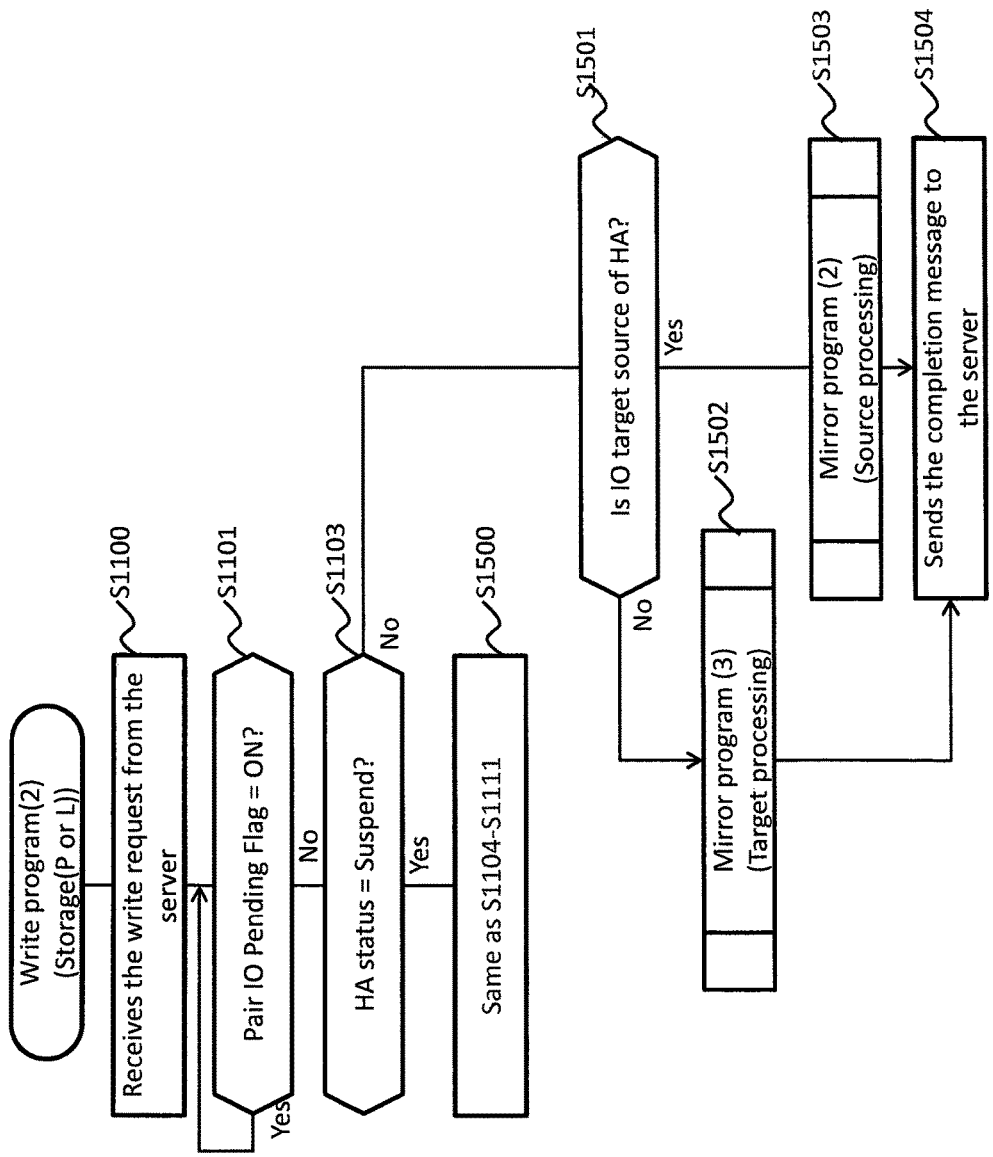
FIG. 26 shows a flow diagram illustrating another example of the process of the write program.

FIG. 26 shows a flow diagram illustrating another example of the process of the write program. It is called write program (2). Steps S1500-S1504 are new steps as compared to FIG. 23. After detecting the PAIR status of HA pair (S1102), the write program checks the copy attribute of the HA pair (S1501). If the status of the HA pair is SUSPEND, the program executes the same processing as steps S1104-S1111 of FIG. 23 (S1500), because the sequence number in the storage(P) is taken over to the storage(L) by the HA suspend processing. If the copy attribute is source, the write program calls mirror program (2) which is mirror program for this configuration (S1503). The program is to replicate the data when the IO request is issued to the source volume of HA pair. If the copy attribute is target, the write program calls mirror program (3) which is mirror program for this configuration (S1502). The program is to replicate the data when the IO request is issued to the target volume of HA pair. The mirror programs (2) and (3) are illustrated in FIGS. 27 and 28, respectively.

Figure 27:
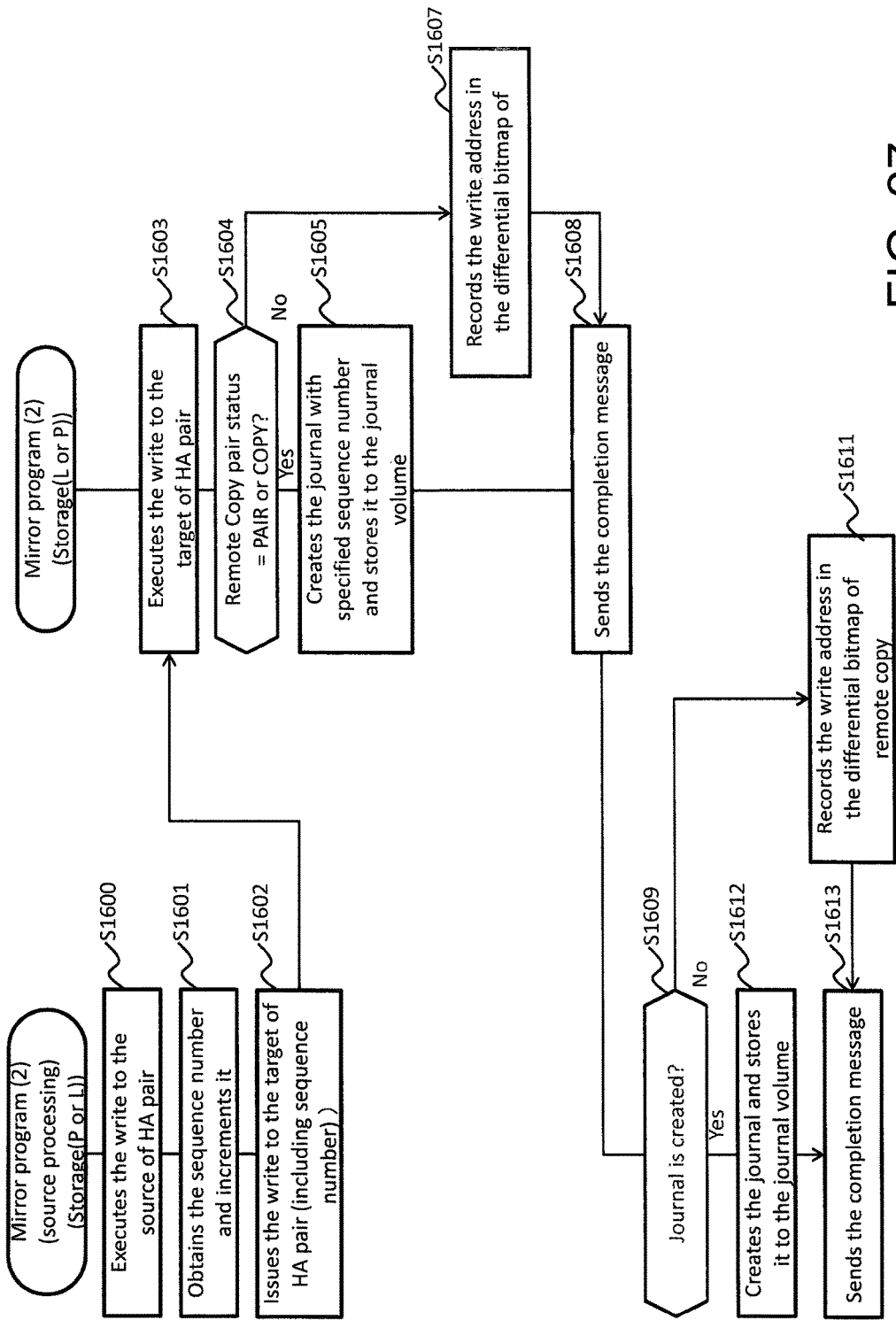
FIG. 27 shows a flow diagram illustrating an example of the process of the mirror program (2).
Figure 28:
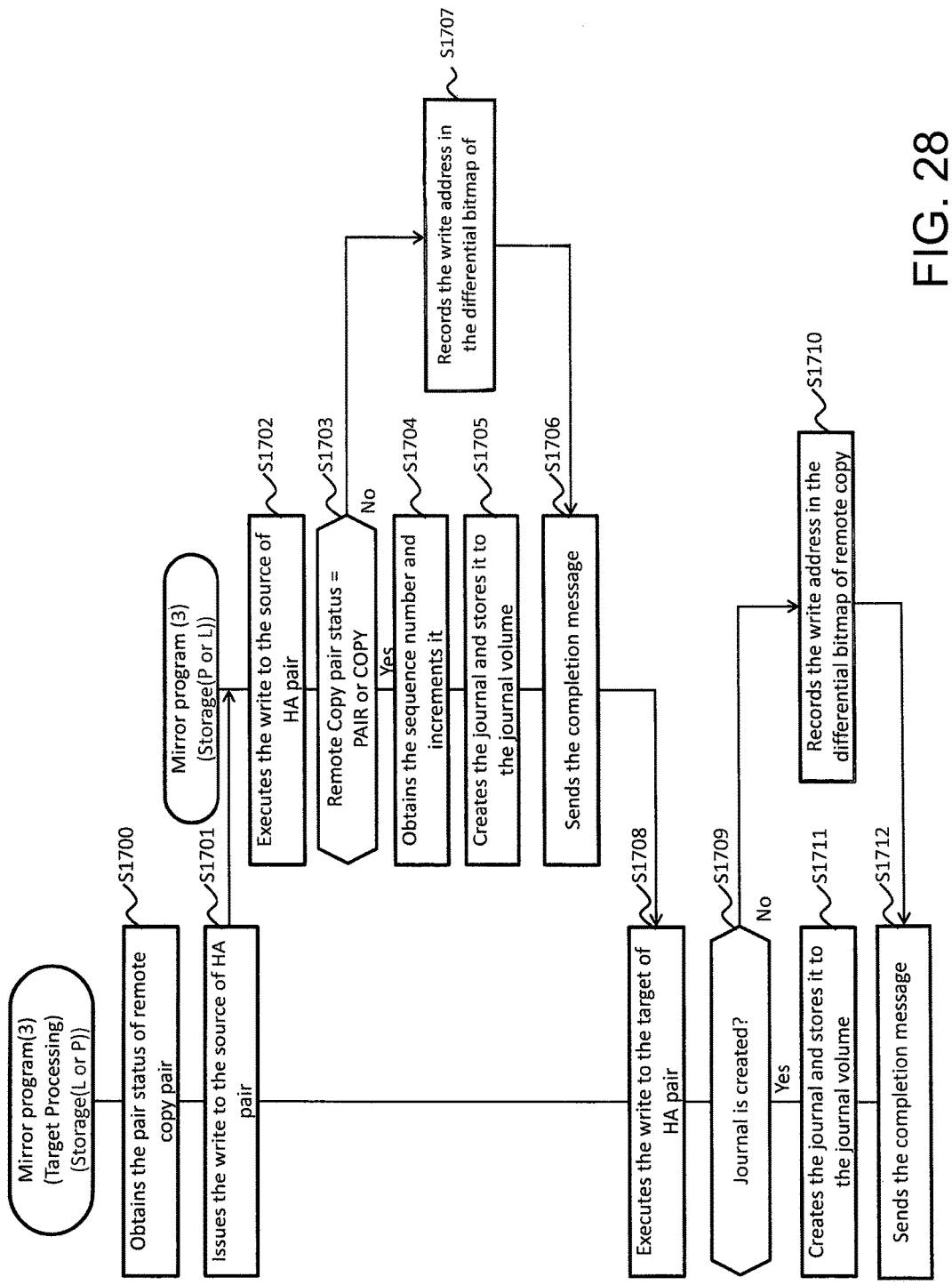
FIG. 28 shows a flow diagram illustrating an example of the process of the mirror program (3).

FIG. 27 shows a flow diagram illustrating an example of the process of the mirror program (2). First, the program executes the write to the source volume of HA pair (S1600). Then, the program obtains the sequence number and increments it (S1601). Next, the program issues the write to the target of the HA pair with the obtained sequence number (S1602). Since the source volume of the remote copy is in the storage(L), the program does not create the journal at the timing.

The mirror program (2) is executed in the storage(L) which receives the write from step S1602. The program executes the write to the target volume of the HA pair (S1603). Then, the program checks the remote copy pair status (S1604). If the pair status is SUSPEND, the program records the write address in the differential bitmap of the remote copy in the storage(L) (S1607). If the pair status is PAIR or COPY, the program creates the journal with the notified sequence number and stores it to the journal volume in the storage(L) (S1605). After execution of S1605 and S1607, the program sends the completion message to the storage(L) (S1608).

The program which receives the completion message from the storage(L) checks whether the journal is created in the storage(L) (S1609). If the journal is not created in the storage(L), the program records the write address in the differential bitmap of the remote copy (S1611). If the journal is created in the storage(P), the program creates the journal with the sequence number assigned at step S1601 and stores it to the journal volume in the storage(P) (S1612). After step S1611 or S1612, the program sends the completion message to the server (S1613).

FIG. 28 shows a flow diagram illustrating an example of the process of the mirror program (3). First, the program obtains the pair status of remote copy (S1700) and issues the write request to the source volume of the HA pair (S1701). The write request includes the obtained pair status. For this discussion, it is assumed that steps S1700 and S1701 of the mirror program (3) are executed in the storage(L).

The mirror program (3) is executed in the storage(P) which receives the write from step S1701. The program executes the write to the source volume of the HA pair (S1702). Next, the program checks the remote copy pair status (S1703). If the pair status is SUSPEND, the program records the write address in the differential bitmap of the remote copy in the storage(P) (S1707). If the pair status is PAIR or COPY, the program obtains the sequence number and increments it (S1704). Then, the program creates the journal and stores it to the journal volume in the storage(P) (S1705). After execution of S1705 or S1707, the program sends the completion message to the storage(L) (S1706). The completion message includes the sequence number obtained at step S1704.

The program which receives the completion message from the storage(P) executes the write to the target volume of the HA pair (S1708). Next, the program checks whether the journal is created in the storage(P) (S1709). If the journal is created in the storage(P), the program creates the journal with the sequence number notified from the storage(P) (S1711). If the journal is not created in the storage(P), the program records the write address in the differential bitmap of remote copy (S1710). After step S1710 or S1711, the program sends the completion message to the server (S1712).

B(4). Path Between Storage(P) and Storage(R) Failure (Third Method)

Two methods which take over the remote copy pair are described above for path failure between the storage(P) and storage(R). The first method suspends HA pair and takes over the sequence number to the storage(L) (see FIG. 21). The second method does not suspend HA pair and does not take over the sequence number (see FIG. 25). The third method which does not suspend HA pair and takes over the sequence number to the storage(L) is described here. The resync program and write program are changed for the third method.

FIG. 29 shows a flow diagram illustrating another example of the process of the source resync program. This is called the source resync program (2). Resync methods take over the sequence number. First, the source resync program (2) is executed in the storage(L) and receives notification of the path failure between storage(P) and storage(R) from step S1401 in FIG. 25. Next, the program stops processing new IO request from the server to the storage(L) (S1801). In particular, the program changes the IO pending flag to ON. During stopping the IO request, the program requests the taking over of the sequence number to the storage(P) (S1802).

The storage(P) which receives the request executes the sequence number program. The sequence number program also stops processing new IO request to the storage(L) (S1803). Then, the program waits for the completion of IO request which remains in the storage(P) (this step is same as S804). After the completion of IO request, the program obtains the sequence number and notifies it to the storage(P) (S1804). After that, the storage(P) resumes processing new IO request to the storage(P). New IO request is processed by the method described in FIG. 30 or 31.

The source resync program receives the sequence number and starts rejecting the write transfer from the storage(P) which has the sequence number higher than the notified sequence number (S1806). Then, the program stores the notified sequence number to the remote copy group table in the storage(P). The stored sequence number is assigned to the new IO request from the server. After that, the program resumes processing new IO request (S1808) and executes the resync of the standby remote copy pair (S1809). Steps S901-S909 of FIG. 19 are executed in step S1809.

Figure 30:
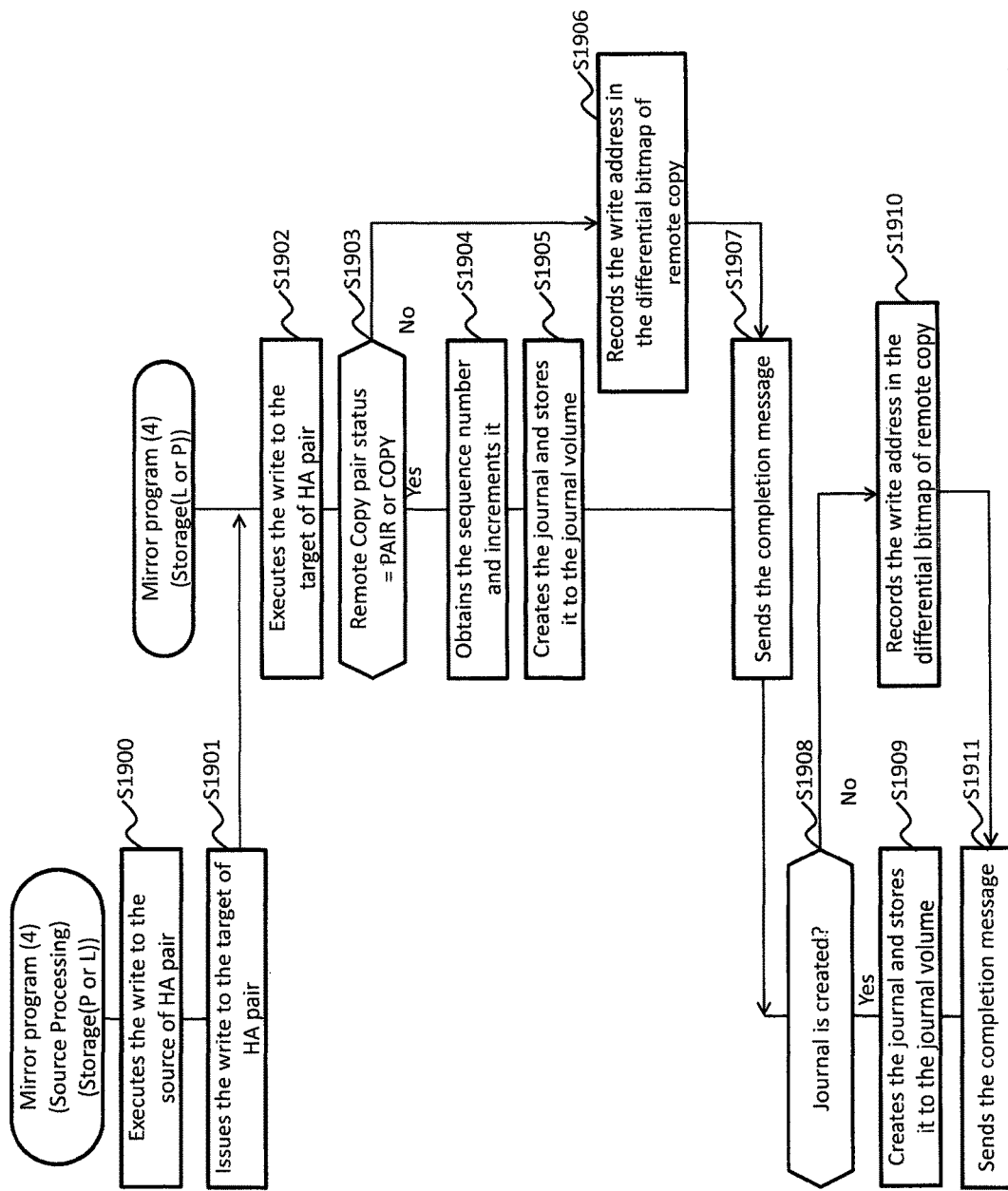
FIG. 30 shows a flow diagram illustrating an example of the process of the mirror program (4).

FIG. 30 shows a flow diagram illustrating another example of the process of the mirror program. It is called the mirror program (4), which is executed instead of the mirror program (2) in step S1503 of FIG. 26. First, the mirror program (4) executes the write to the source volume of the HA pair (S1900). Then, the program issues the write request to the target volume of HA pair (S1901). For this discussion, it is assumed that steps S1900 and S1901 of the mirror program (4) are executed in the storage(P).

The storage(L) which has the target volume of the HA pair receives the write request and executes the mirror program (4). The mirror program (4) executes the write to the target volume of the HA pair (S1902). Then, the program checks the remote copy pair status (S1903). If the pair status is SUSPEND, the program records the write address in the differential bitmap of remote copy (S1906). If the pair status is PAIR or COPY, the program obtains the sequence number and increments it (S1904). Then, the program creates the journal and stores it to the journal volume in the storage(L) (S1905). After execution of step S1905 or S1906, the program sends the completion message to the storage(P) (S1907). This completion message includes the sequence number obtained at step S1904.

The mirror program (4) which receives the completion message checks whether journal is created in the storage(L) (S1908). If the journal is created in the storage(L), the program creates the journal with the sequence number notified from the storage(L) (S1909). If the journal is not created in the storage(L), the program records the write address in the differential bitmap of remote copy (S1910). After step S1909 or S1910, the program sends the completion message to the server (S1911).

Figure 31:
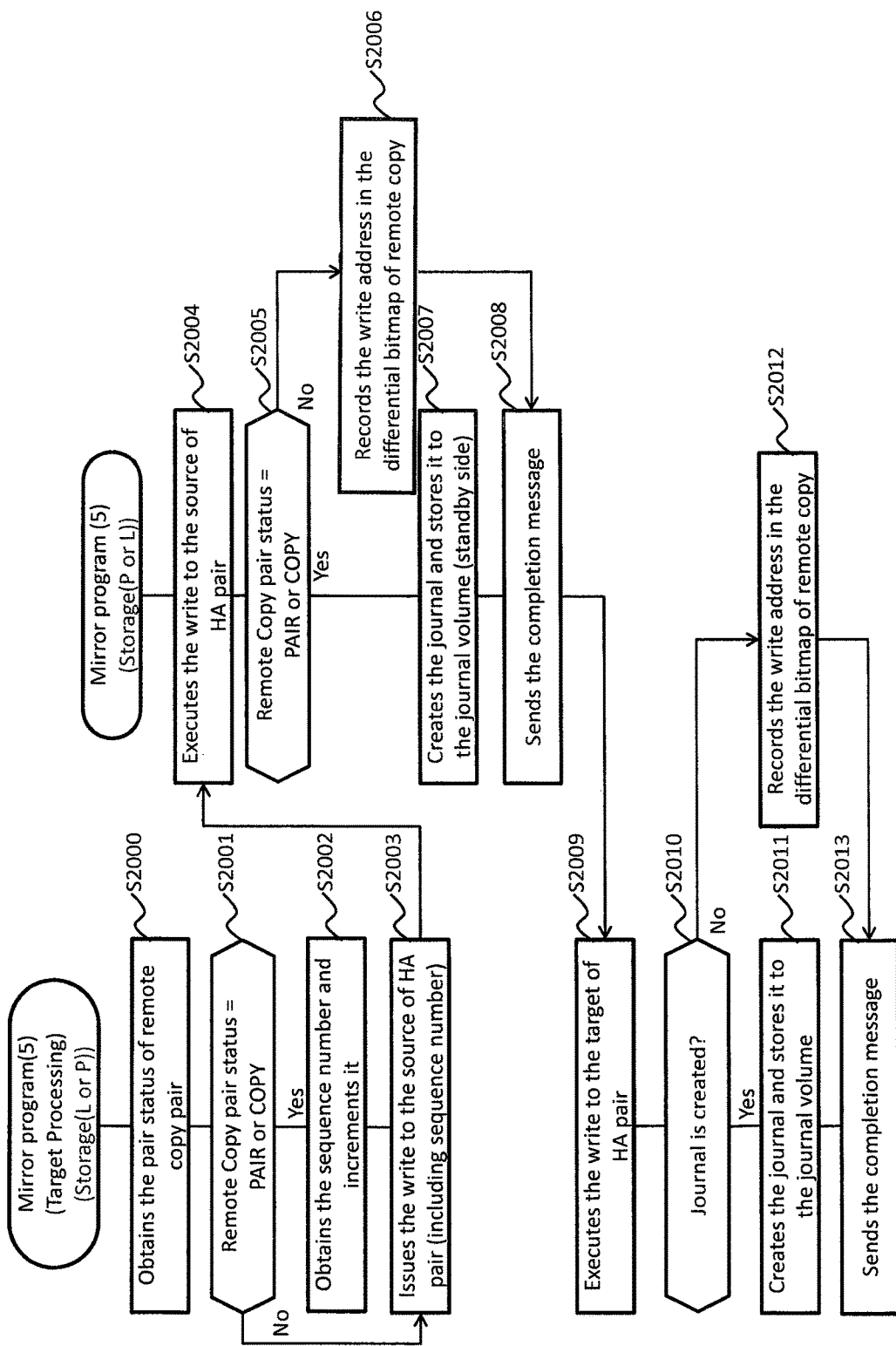
FIG. 31 shows a flow diagram illustrating an example of the process of the mirror program (5).

FIG. 31 shows a flow diagram illustrating another example of the process of the mirror program. It is called the mirror program (5), which is executed instead of the mirror program (3) in step S1502 of FIG. 26. First, the program obtains the pair status of remote copy (S2000) and checks the remote copy pair status (S2001). If the pair status is PAIR or COPY, the program obtains the sequence number and increments it (S2002). After that, the program issues the write request to the source volume of the HA pair, including the sequence number (S2003). If the pair status is SUSPEND in step S2001, the program skips step S2002 and proceeds to step S2003. In this case, the write request does not include the sequence number. For this discussion, it is assumed that steps S2000-S2003 of the mirror program (5) are executed in the storage(L).

The mirror program (5) is executed in the storage(P) which receives the write request from step S2003. The program executes the write to the source volume of the HA pair (S2004). Next, the program checks the remote copy pair status (S2005). If the pair status is SUSPEND, the program records the write address in the differential bitmap of the remote copy in the storage(P) (S2006). If the pair status is PAIR or COPY, the program creates the journal with the notified sequence number and stores it to the journal volume in the storage(P) (S2007). After execution of S2006 or S2007, the program sends the completion message to the storage(L) (S2008).

The program which receives the completion message from the storage(P) executes the write to the target volume of the HA pair (S2009). Next, the program checks whether the journal is created in the storage(P) (S2010). If the journal is created in the storage(P), the program creates the journal with the sequence number obtained at step S2002 (S2011). If the journal is not created in the storage(P), the program records the write address in the differential bitmap of remote copy (S2012). After step S2011 or S2012, the program sends the completion message to the server (S2013).

C. Pair Status Change to Reflect Takeover by Standby Remote Copy Pair

In the method mentioned above, if the pair display command is issued after regular remote copy pair failure, SUSPEND(E) is reported to the server as the remote copy pair status. However, if the standby remote copy pair can take over the remote copy processing, PAIR status should be reported to the server as the remote copy pair status.

Figure 32:
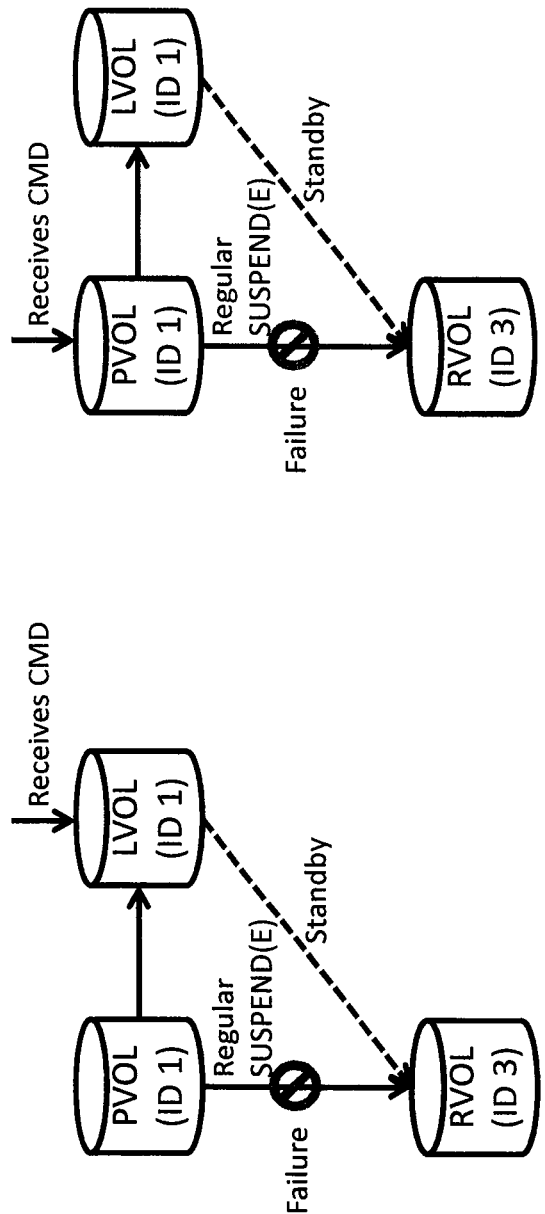
FIG. 32 illustrates the state just after the regular remote copy pair status is changed to SUSPEND(E) by the failure.

FIG. 32 illustrates the state just after the regular remote copy pair status is changed to SUSPEND(E) by the failure. With the configuration on the left side of FIG. 32, the storage(L) receives the command from the server. The pair operation program described in FIG. 16 proceeds to step S408 to execute the command and reports the SUSPEND(E) as the regular remote copy pair status in step S409. The case where the HA pair is suspended by failure after remote copy pair failure is the same as the status mentioned above. With that case, the program proceeds to step S408 via S406. With the configuration on the right side of FIG. 32, the storage(P) receives the command from the server. The pair operation program described in FIG. 16 proceeds to step S402 and reports the SUSPEND(E) as the regular remote copy pair status.

Figure 33:
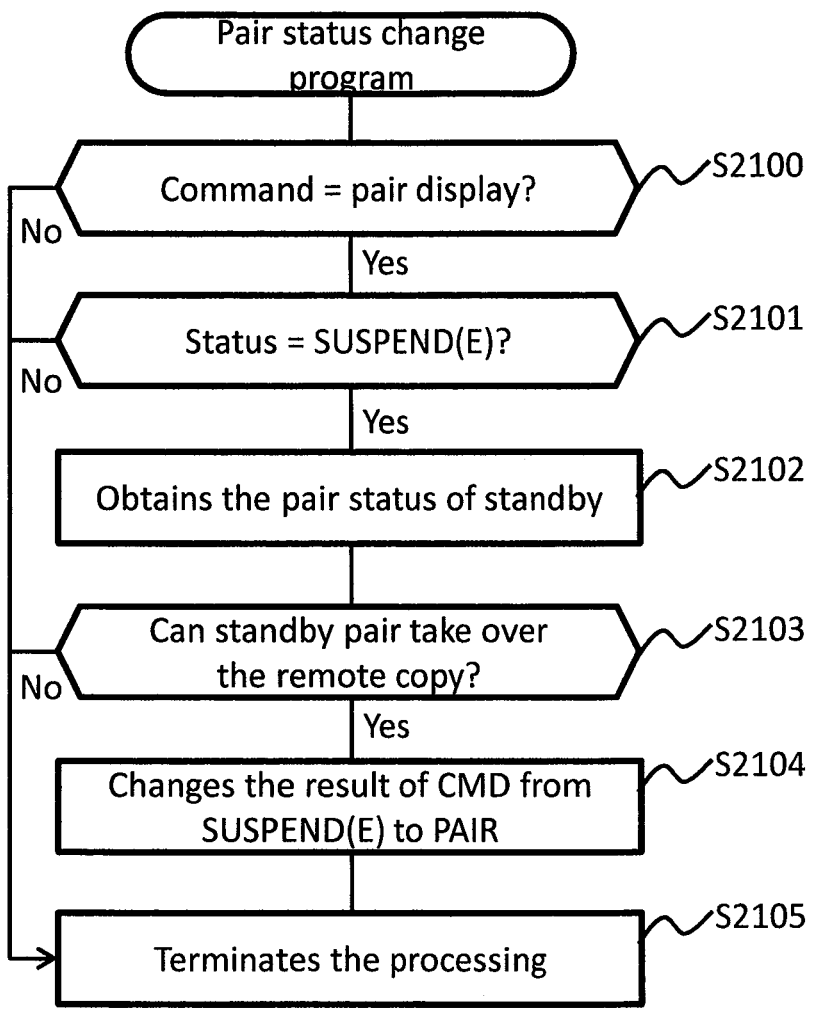
FIG. 33 shows a flow diagram illustrating an example of the process of the pair status change program in order to report PAIR status to the server.

FIG. 33 shows a flow diagram illustrating an example of the process of the pair status change program in order to report PAIR status to the server. The processing is added to just after step S408 and S402 of FIG. 16. This program is stored in the storage program 208 in the storage system (see FIG. 4). First, the program checks whether the command from the server is pair display or not (S2100). If the result is "no", the program proceeds to step S2105. If the result is "yes", the program checks whether the pair status obtained at step S402 or S408 is SUSPEND(E) or not (S2101). If the result is no, the program proceeds to step S2105. If the result is "yes", the program obtains the pair status of standby pair (S2102). Then, the program checks whether the standby pair can take over the remote copy or not (S2103). For example, if the path between the storage(L) and storage(R) has failed, the standby remote copy pair cannot take over the remote copy. If the result is "no", the program proceeds to step S2105. If the result is yes, the program changes the result obtained at step S402 or S408 from SUSPEND(E) to PAIR status indicating takeover of the copying by the standby remote copy pair (S2104). Finally, the program terminates the processing (S2105).

D. Management Server

The technologies mentioned above can be executed by a management server. In the example of FIGS. 34 to 39, the management server executes the numerous processes of the invention, such as mirror ID virtualization, automated standby pair creation, and so on. For example, instead of the server, the management server may issue the HA pair creation command, the pair operation command, the resync request, and the like.

Figure 34:
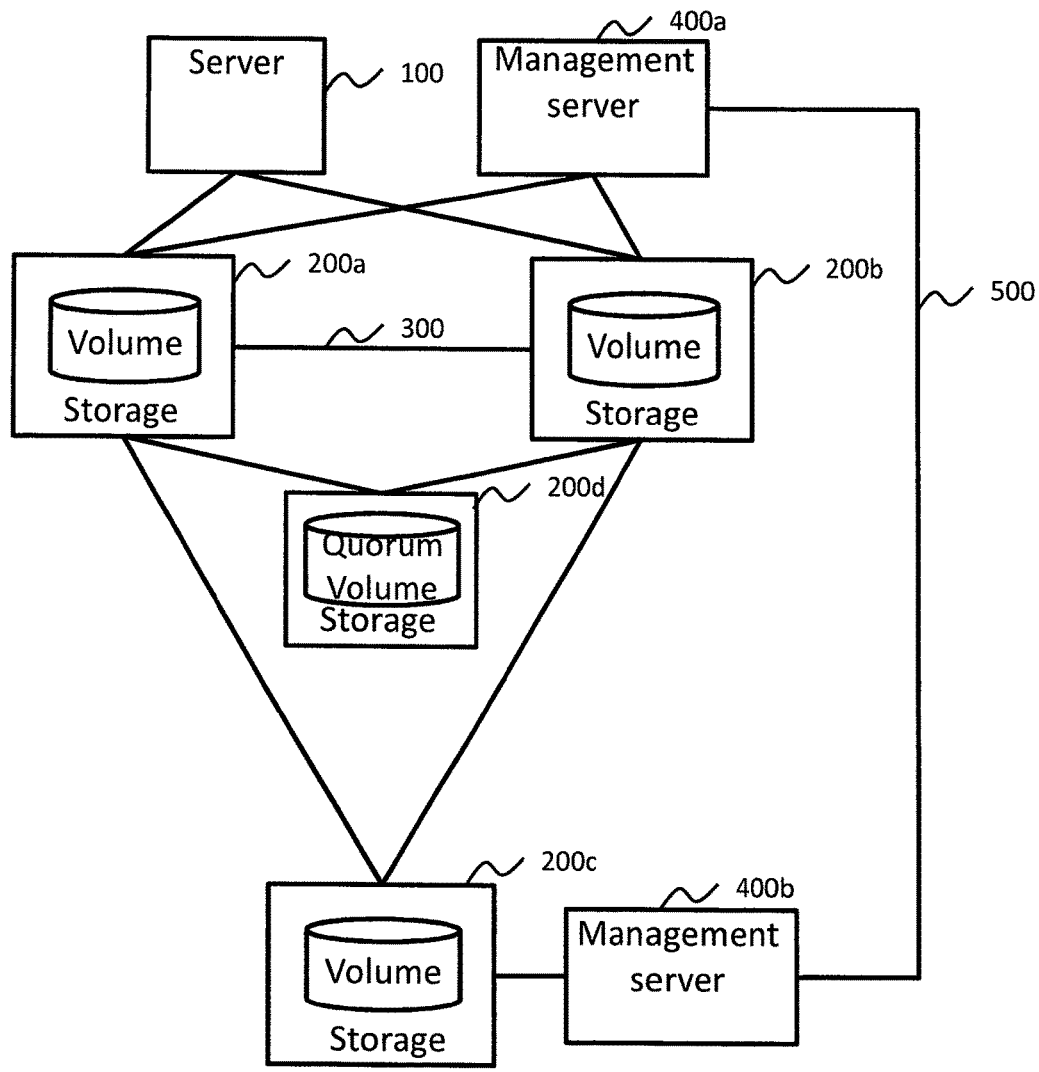
FIG. 34 illustrates another example of a hardware configuration of a computer system in which the method and apparatus of the invention may be applied.

FIG. 34 illustrates another example of a hardware configuration of a computer system in which the method and apparatus of the invention may be applied. This computer system includes management servers 400a and 400b. The management server 400a is connected to the storage(P) 200a and storage(L) 200b. The management server 400b is connected to the storage(R) 200c. The two management servers 400a and 400b are connected to each other. In another embodiment, a one management server configuration in which the management server 400a is connected to all three storage can be considered.

FIG. 35 shows an example of a management server mirror ID table. When the management server executes the mirror ID virtualization, the management server manages the virtual mirror ID. Therefore, the storage does not manage the virtual mirror ID. This table is stored in a control information unit in the management server. This table manages virtual mirror ID, P-R mirror ID, L-R mirror ID. The virtual mirror ID is a virtualized mirror ID. The P-R mirror ID is a physical mirror ID of the remote copy pair between the storage(P) and storage(R). The L-R mirror ID is a physical mirror ID of the remote copy pair between the storage(L) and storage(R).

Figure 36:
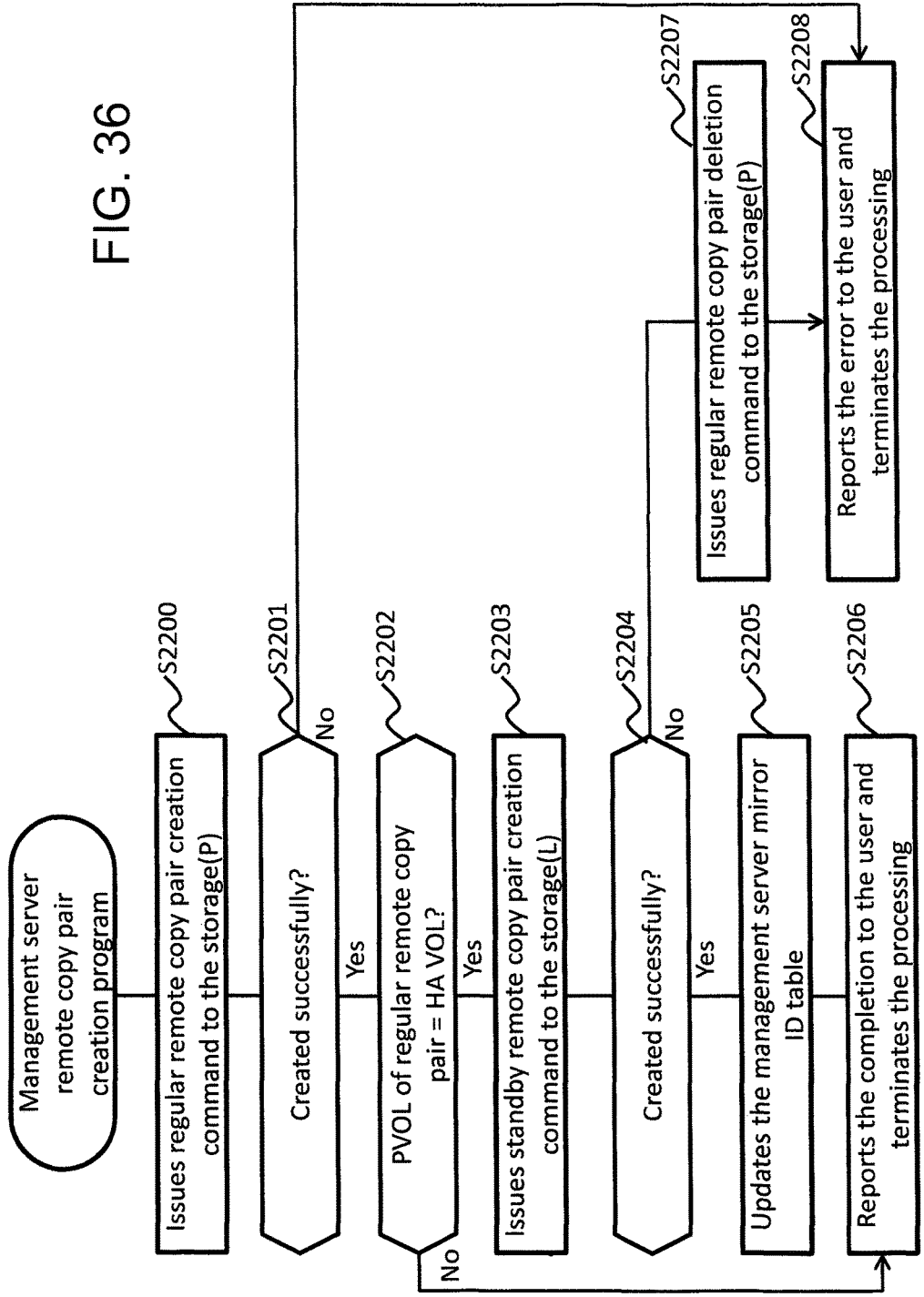
FIG. 36 shows a flow diagram illustrating an example of the process of a management server remote copy pair creation program which creates the standby remote copy pair automatically when the remote copy pair is created.

FIG. 36 shows a flow diagram illustrating an example of the process of a management server remote copy pair creation program which creates the standby remote copy pair automatically when the remote copy pair is created. This program is stored in a program unit in the management server and executed by a processor in the management server. First, the management server remote copy pair creation program issues a regular remote copy pair creation command to the storage(P) (see, e.g., steps S200 to S209 of FIG. 14) after receiving user instruction (S2200). Then, the program receives the response from the storage(P) and checks whether the pair is created successfully or not (S2201). If the result is "no", the program proceeds to step S2208 and reports the error to the user and terminates the processing (S2208). If the result is "yes", the program checks whether the source volume of the remote copy pair is a HA volume or not (S2202). If the result is "no", the program proceeds to step S2206 and reports the completion to the user and terminates the processing (S2206). If the result is "yes", the program issues a standby remote copy pair creation command to the storage(L) (S2203) (see, e.g., steps S100 to S110 of FIG. 13). Then, the program receives the response from the storage(L) and checks whether the pair is created successfully or not (S2204). If the result is "no", the program issues a regular remote copy pair deletion command to the storage (P) and progresses to step S2208. If the result is "yes", the program updates the management server mirror ID table (S2205). After S2205, the program reports the completion to the user and terminates the processing (S2206).

Figure 37:
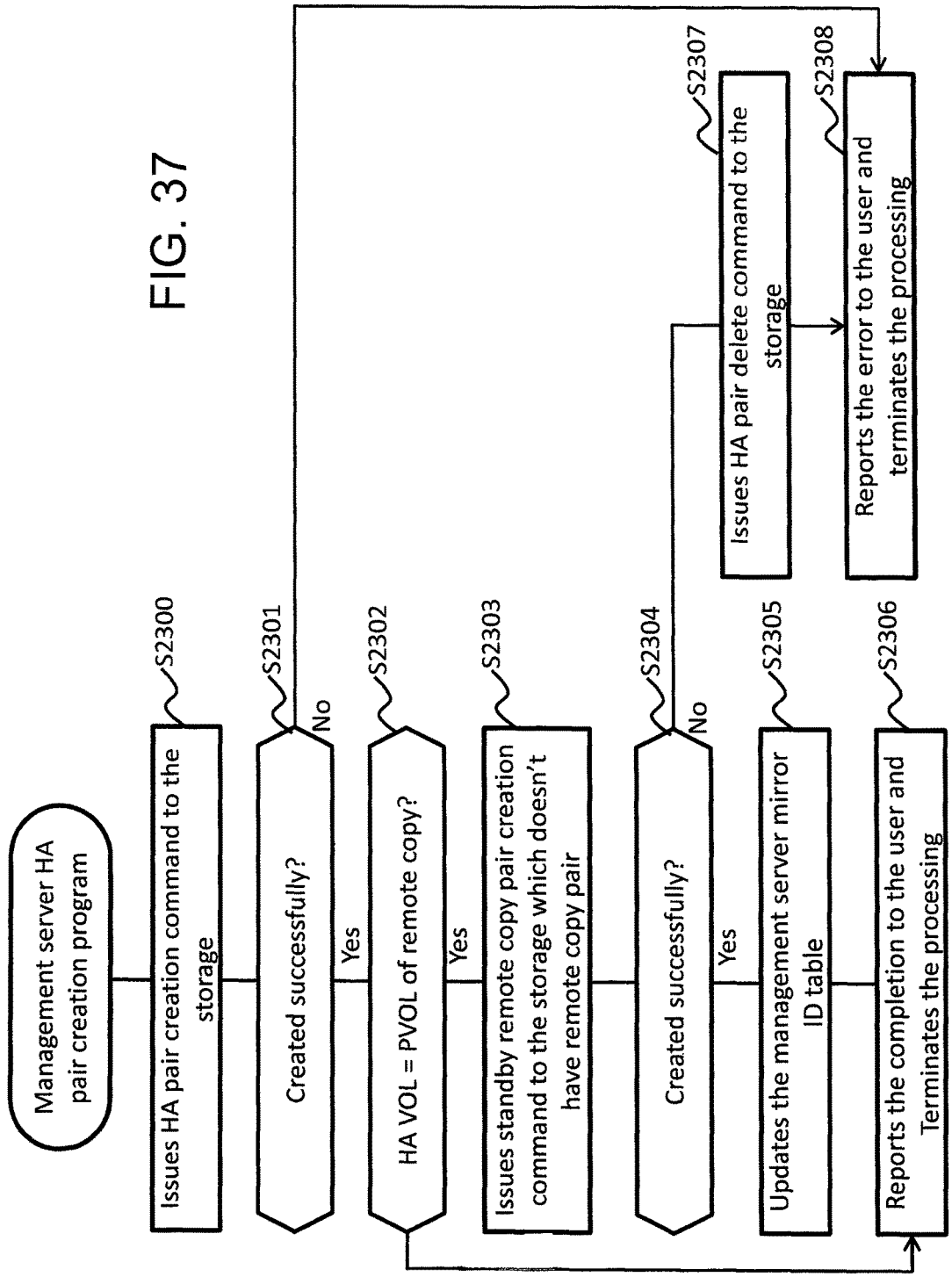
FIG. 37 shows a flow diagram illustrating an example of the process of a management server HA pair creation program which creates the standby remote copy pair automatically when the HA pair is created.

FIG. 37 shows a flow diagram illustrating an example of the process of a management server HA pair creation program which creates the standby remote copy pair automatically when the HA pair is created. This program is stored in the program unit in the management server and executed by the processor in the management server. First, the management server HA pair creation program issues a HA pair creation command to the storage(P) or (L) after receiving user instruction (S2300). Then, the program receives the response from the storage (see, e.g., steps S300 to S307 of FIG. 15) and checks whether the pair is created successfully or not (S2301). If the result is "no", the program proceeds to step S2308 and reports the error to the user and terminates the processing (S2308). If the result is "yes", the program checks whether the HA volume is a source volume of regular remote copy pair or not (S2302). If the result is "no", the program proceeds to step S2306 and reports the completion to the user and terminates the processing (S2306). If the result is "yes", the program issues a standby remote copy pair creation command to the storage which does not have source volume of regular remote copy pair (S2303). If the storage(P) has s source volume of regular remote copy pair, the command is issued to the storage(L) (see, e.g., steps S310 to S311 of FIG. 15). Then, the program receives the response from the storage and checks whether the pair is created successfully or not (S2304). If the result is "no", the program issues a HA pair deletion command to the storage(P) or (L) (see, e.g., step S314 of FIG. 15) and proceeds to step S2308. If the result is "yes", the program updates the management server mirror ID table (S2305). After S2305, the program reports the completion to the user and terminates the processing (S2306).

Figure 38:
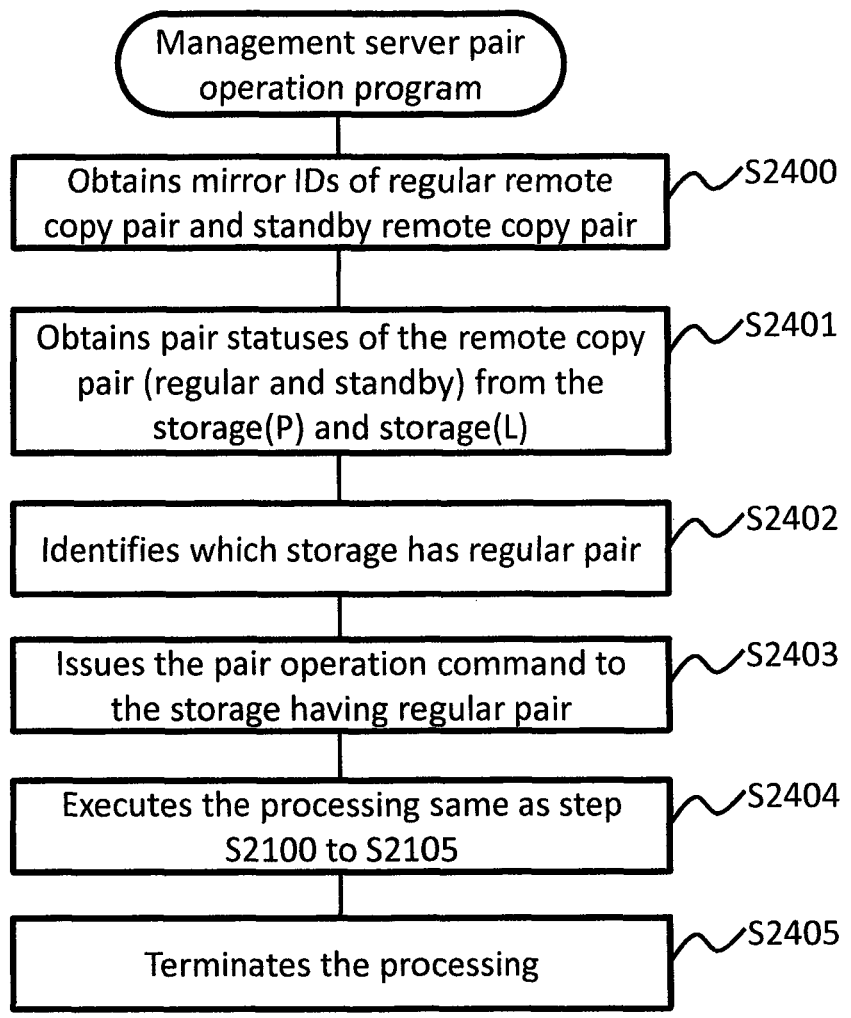
FIG. 38 shows a flow diagram illustrating an example of the process of a management server pair operation program which identifies the storage having regular remote copy pair and issues the remote copy pair operation command to the identified storage.

FIG. 38 shows a flow diagram illustrating an example of the process of a management server pair operation program which identifies the storage having regular remote copy pair and issues the remote copy pair operation command to the identified storage. This program is stored in program unit in the management server and executed by processor in the management server. First, the management server pair operation program obtains mirror IDs of the regular remote copy pair and standby remote copy pair (S2400). Then, the program obtains the pair status of the regular remote copy pair and the pair status of the standby remote copy pair (S2401). Next, the program identifies which storage has the regular pair (S2402) and issues the pair operation command to the identified storage (S2403). The above steps can be contrasted with those of the pair operation program executed in the storage systems in FIGS. 16 and 17. After that, the program receives the response from the storage and executes the steps which are the same as steps S2100 to S2105 of FIG. 33 (S2404). In FIG. 33, steps S2100 to S2105 are executed in the storage. However, step S2100 to S2105 are executed in the management server in FIG. 38. Finally, the program terminates the processing (S2405).

Figure 39:
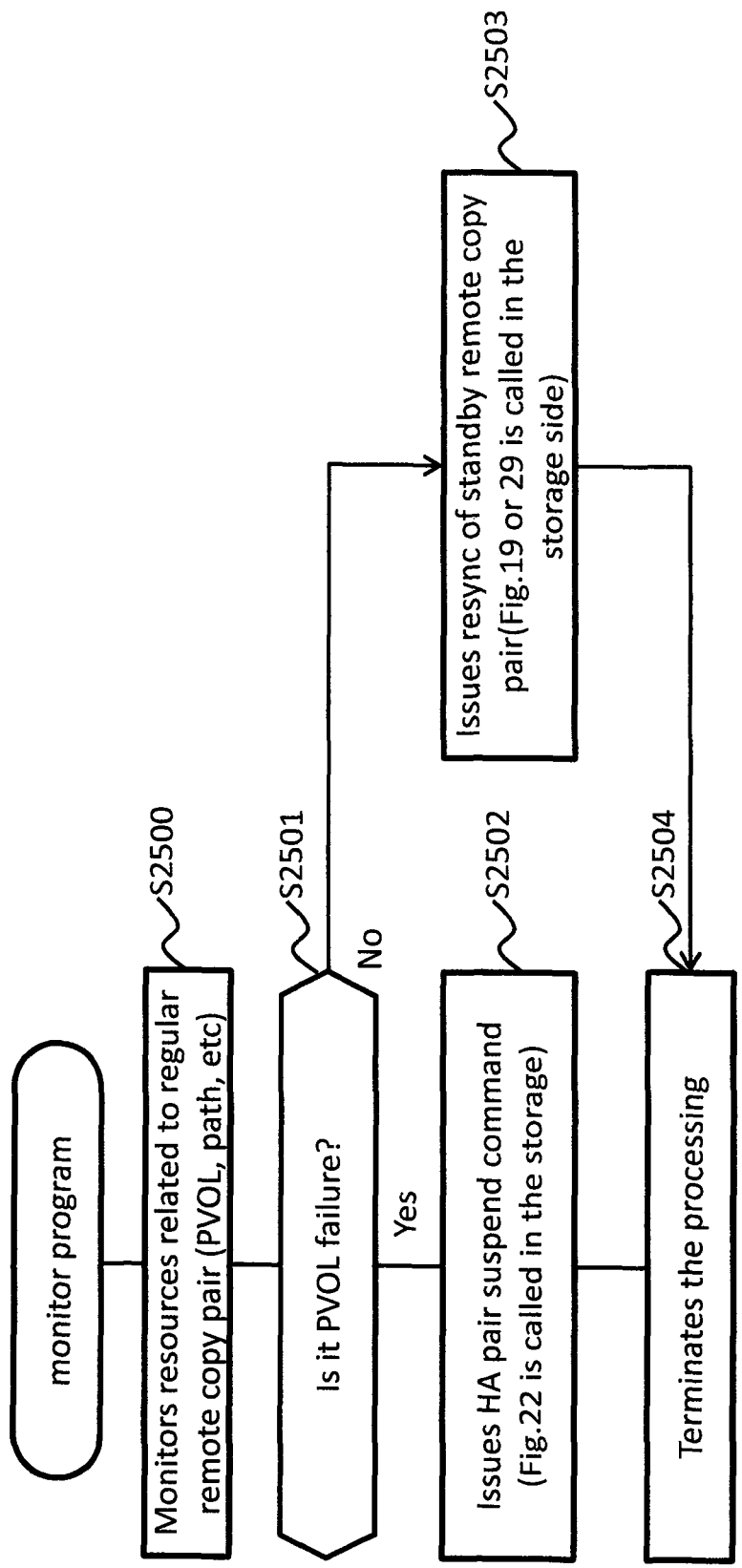
FIG. 39 shows a flow diagram illustrating an example of the process of a monitor program which monitors storage status change and issues HA pair suspend command or resync command for standby remote copy pair.

FIG. 39 shows a flow diagram illustrating an example of the process of a monitor program which monitors storage status change and issues HA pair suspend command or resync command for standby remote copy pair. This program is stored in the program unit in the management server and executed by the processor in the management server. The process of FIG. 39 can be contrasted with the process of the failure detection program shown in FIG. 21 or FIG. 25. First, the monitor program monitors resources related to the regular remote copy pair (S2500). For example, the resources include regular remote copy pair status, path status, volume failure, storage failure, and so on. If the program detects the failure, the program proceeds to step S2501. If the program does not detect any failure, the program keeps executing step S2500 periodically. At step S2501, the program checks whether the failure is PVOL failure or not. If the result is "yes", the program issues a HA pair suspend command to the storage(L) (S2502) (see, e.g., steps S704 to S705 of FIG. 21 or FIG. 25, calling the HA suspend program of FIG. 22). If the result is "no", the program issues resync of standby remote copy pair (S2503) (see, e.g., steps 1401 to S705 of FIG. 25, calling the source resync program of FIG. 19 or 29). After S2502 or S2503, the program terminates the processing (S2503). In the storage, S704 (HA suspend program) and S1401 (source resync program) and subsequent steps are executed after receiving the command from the management server.

Of course, the system configurations illustrated in FIGS. 1, 2, and 34 are purely exemplary of information systems in which the present invention may be implemented, and the invention is not limited to a particular hardware configuration. The computers and storage systems implementing the invention can also have known IO devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for virtualizing remote copy pair in three data center configuration. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A computer system comprising:
   a first storage system including a first storage device and a first controller being configured to manage a first volume, whose storage area corresponds to a storage area of the first storage device, with a first internal volume identifier, and to provide the first volume with a given first virtual volume identifier to a server; and
   a second storage system including a second storage device and a second controller being configured to manage a second volume, whose storage area corresponds to a storage area of the second storage device, with a second internal volume identifier, and to provide the second volume with the given first virtual volume identifier to the server;

wherein the first storage system and the second storage system are coupled to a third storage system including a third storage device and a third controller being configured to manage a third volume whose storage area corresponds to a storage area of the third storage device;

wherein the first controller in the first storage system is configured to manage a first copy pair between the first volume and the third volume with a first internal copy identifier, and to provide a first copy pair with a given virtual copy pair identifier to the server; and wherein the second controller in the second storage system is configured to manage a second copy pair between the second volume and the third volume with a second internal copy identifier, and to provide a second copy pair with the given virtual copy pair identifier to the server.

2. The computer system according to claim 1, wherein one of the first copy pair and the second copy pair is a regular pair having an operation status, and the other of the first copy pair and the second copy pair is a standby pair having a standby status;

wherein, in response to a write command to one of the first volume and the second volume, data of the write command that is copied from the one of the first volume and the second volume receiving the write command to the other one of the first volume and the second volume; and wherein data of the write command is copied to the third volume by the regular pair.

3. The computer system according to claim 1, wherein one of the first copy pair and the second copy pair is a regular pair having an operation status, and the other of the first copy pair and the second copy pair is a standby pair having a standby status; and wherein the third controller is configured to create the standby pair using the given virtual copy pair identifier, the given virtual copy pair identifier being provided by the first internal copy identifier or the second internal copy identifier of the regular pair or the given virtual copy pair identifier of the regular pair.

4. The computer system according to claim 1, wherein one of the first copy pair and the second copy pair is a regular pair having an operation status, and the other of the first copy pair and the second copy pair is a standby pair having a standby status; and wherein, when copy operation of the regular pair is disenable, the standby pair is resynchronized to resynchronize data of the standby pair.

5. The computer system according to claim 4, wherein, after the standby pair is resynchronized, the standby pair is changed from the standby status to the operation status to take over the operation status of the regular pair.

6. The computer system according to claim 4, wherein the first volume and the second volume form a high availability pair;

wherein the first copy pair is the regular pair and the second copy pair is the standby pair; and wherein, upon receipt of a notification of failure of resource relating to the first copy pair from the first storage system, the second controller of the second storage system is configured to suspend the high availability pair between the first volume and the second volume, and then resynchronize the standby pair.

7. The computer system according to claim 4, wherein the first volume and the second volume form a high availability pair;

wherein the first copy pair is the regular pair and the second copy pair is the standby pair; and wherein if the high availability pair of the first volume and the second volume is suspended and the second controller of the second storage system changes a high availability pair status of the second volume to suspend status and makes the second volume being able to execute a request from a server, the second controller of the second storage system is configured to resynchronize the standby pair.

8. The computer system according to claim 7, wherein the first controller is configured, in response to a write request from the server to the first storage system, to:

determine whether the first volume of the high availability pair has a VALID status indicating the first volume of the high availability pair has newest data as compared to the second volume, or an INVALID status;

if the first volume has an INVALID status, send an error message to the server; and if the first volume has a VALID status, execute the write request to the first volume which is the target of the write request, record a write address of executing the write request in a differential bitmap of the high availability pair, and if a copy pair status of the first copy pair between the first volume and the third volume is SUSPEND, then record in the first storage system the write address in the differential bitmap of remote copy of data of the write request to the third storage system, and if the copy pair status of the first copy pair is PAIR or COPY, then obtain the sequence number which is stored in the first storage system and increment the sequence number, and create a journal and store the journal in a first journal volume of the first storage system.

9. The computer system according to claim 4, wherein the first volume and the second volume form a high availability pair;

wherein the first copy pair is the regular pair and the second copy pair is the standby pair; and wherein, upon receipt of a notification of failure of resource relating to the first copy pair from the first storage system, the second controller of the second storage system is configured to suspend the high availability pair of the first volume and the second volume, and obtains a sequence number which is stored in the first storage system to ensure data consistency for copying data to the third storage system, and resynchronize the standby copy pair.

10. The computer system according to claim 4, wherein the first volume and the second volume form a high availability pair;

wherein the first copy pair is the regular pair and the second copy pair is the standby pair; and wherein, upon receipt of a notification of failure of resource relating to the first copy pair from the first storage system, the second controller of the second storage system obtains a sequence number which is stored in the first storage system to ensure data consistency for copying data to the third storage system, and resynchronize the standby copy pair.

11. The computer system according to claim 1,
wherein, in creating the first copy pair between the first volume and the third volume, when the first volume and the second volume have formed a high availability pair, the first copy pair is created as a regular pair having an operation status and the second copy pair is created as a standby pair having a standby status.

12. The computer system according to claim 1,
wherein, in creating the first volume and the second volume as a high availability pair, when the first volume and the third volume have formed the first copy pair, the first copy pair is a regular pair having an operation status and the second copy pair is created as a standby pair having a standby status.

13. The computer system according to claim 1,
wherein, upon receiving a pair operation command by the first storage system, the first controller is configured to:
execute the pair operation command for the first copy pair if the first copy pair is a regular pair having an operation status; and
transfer the pair operation command to the second storage system to be executed by the second controller for the second copy pair if the first copy pair is a standby pair having a standby status.

14. The computer system according to claim 13,
wherein if the first copy pair is the regular pair having the operation status, and if a copy pair status of the first copy pair is SUSPEND(E) indicating suspension of copying between the first volume and the third volume in the first copy pair, and if the second copy pair which is a standby pair having a standby status can take over the copying to the third volume, a result of the pair operation command is changed as the copy pair status of the first copy pair from SUSPEND(E) to PAIR indicating takeover of the copying by the second copy pair; and
wherein if the first copy pair is the standby pair having the standby status, and if a copy pair status of the second copy pair is SUSPEND(E) indicating suspension of copying between the second volume and the third volume in the second copy pair, and if the first copy pair can take over the copying to the third volume, a result of the pair operation command is changed as the copy pair status of the second copy pair from SUSPEND(E) to PAIR indicating takeover of the copying by the first copy pair.

15. A method of managing a computer system which includes a first storage system having a first storage device and a first controller for managing a first volume, a second storage system having a second storage device and a second controller for managing a second volume, and a third storage system having a third storage device and a third controller, the method comprising:
managing the first volume, whose storage area corresponds to a storage area of the first storage device, with a first internal volume identifier, and providing the first volume with a given first virtual volume identifier to a server;
managing the second volume, whose storage area corresponds to a storage area of the second storage device, with a second internal volume identifier, and to provide the second volume with the given first virtual volume identifier to the server;
managing the third volume whose storage area corresponds to a storage area of the third storage device;
managing a first copy pair between the first volume and the third volume with a first internal copy identifier, and providing a first copy pair with a given virtual copy pair identifier to the server; and
managing a second copy pair between the second volume and the third volume with a second internal copy identifier, and providing a second copy pair with the given virtual copy pair identifier to the server.

16. The method according to claim 15, wherein one of the first copy pair and the second copy pair is a regular pair having an operation status, and the other of the first copy pair and the second copy pair is a standby pair having a standby status, the method further comprising:
in response to a write command to one of the first volume and the second volume, copying data of the write command from the one of the first volume and the second volume receiving the write command to the other one of the first volume and the second volume; and
copying data of the write command to the third volume by the regular pair.

17. The method according to claim 15, wherein one of the first copy pair and the second copy pair is a regular pair having an operation status, and the other of the first copy pair and the second copy pair is a standby pair having a standby status, the method further comprising:
creating, by the third controller, the standby pair using the given virtual copy pair identifier, the given virtual copy pair identifier being provided by the first internal copy identifier or the second internal copy identifier of the regular pair or the given virtual copy pair identifier of the regular pair.

18. The method according to claim 15, wherein one of the first copy pair and the second copy pair is a regular pair having an operation status, and the other of the first copy pair and the second copy pair is a standby pair having a standby status, the method further comprising:
when copy operation of the regular pair is disenable, resynchronizing the standby pair to resynchronize data of the standby pair.

19. The method according to claim 18, wherein the first volume and the second volume form a high availability pair, wherein the first copy pair is the regular pair and the second copy pair is the standby pair, the method further comprising:
if the high availability pair of the first volume and the second volume is suspended and the second controller of the second storage system changes a high availability pair status of the second volume to suspend status and makes the second volume being able to execute a request from a server, resynchronizing, by the second controller of the second storage system, the standby pair.

20. The method according to claim 19, further comprising performing by the first controller, in response to a write request from the server to the first storage system:
determining whether the first volume of the high availability pair has a VALID status indicating the first volume of the high availability pair has newest data as compared to the second volume, or an INVALID status;
if the first volume has an INVALID status, sending an error message to the server; and
if the first volume has a VALID status, executing the write request to the first volume which is the target of the write request, recording a write address of executing the write request in a differential bitmap of the high availability pair, and if a copy pair status of the first copy pair between the first volume and the third volume is SUSPEND, then recording in the first storage system the write address in the differential bitmap of remote copy of data of the write request to the third storage system, and if the copy pair status of the first copy pair is PAIR or COPY, then obtaining the sequence number which is stored in the first storage system and incrementing the sequence number, and creating a journal and store the journal in a first journal volume of the first storage system.

\* \* \* \* \*